(12) United States Patent
Van der Auwera et al.

(10) Patent No.: US 11,652,984 B2
(45) Date of Patent: May 16, 2023

(54) POSITION-DEPENDENT INTRA-INTER PREDICTION COMBINATION IN VIDEO CODING

(71) Applicant: QUALCOMM Incorporated, San Diego, CA (US)

(72) Inventors: Geert Van der Auwera, Del Mar, CA (US); Luong Pham Van, San Diego, CA (US); Adarsh Krishnan Ramasubramonian, Irvine, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/684,440

(22) Filed: Nov. 14, 2019

(65) Prior Publication Data

US 2020/0162728 A1    May 21, 2020

Related U.S. Application Data

(60) Provisional application No. 62/768,655, filed on Nov. 16, 2018, provisional application No. 62/784,140, filed on Dec. 21, 2018.

(51) Int. Cl.
*H04N 19/105*      (2014.01)
*H04N 19/159*      (2014.01)
(Continued)

(52) U.S. Cl.
CPC ......... *H04N 19/105* (2014.11); *H04N 19/132* (2014.11); *H04N 19/136* (2014.11);
(Continued)

(58) Field of Classification Search
None
See application file for complete search history.

(56) References Cited

U.S. PATENT DOCUMENTS 9,374,578 B1   6/2016  Mukherjee et al.
11,006,109 B2  5/2021  Jang et al.
(Continued)

FOREIGN PATENT DOCUMENTS

CN      101877785    * 11/2010

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

(Continued)

*Primary Examiner* — Neil R Mikeska
(74) *Attorney, Agent, or Firm* — Shumaker & Sieffert, P.A.

(57) ABSTRACT

An example device for coding (encoding or decoding) video data includes a memory configured to store video data; and one or more processors implemented in circuitry and configured to: determine a first number of neighboring blocks to a current block of the video data that are intra-predicted; determine a second number of the neighboring blocks that are inter-predicted; determine a first weight value to be applied to intra-prediction samples of an intra-prediction block for the current block; determine a second weight value to be applied to inter-prediction samples of an inter-prediction block for the current block; generate a prediction block for the current block as a weighted combination of the intra-prediction block to which the first weight value is (Continued)

applied and the inter-prediction block to which the second weight value is applied; and code the current block using the prediction block.

28 Claims, 23 Drawing Sheets

(51) Int. Cl.
*H04N 19/176* (2014.01)
*H04N 19/423* (2014.01)
*H04N 19/136* (2014.01)
*H04N 19/132* (2014.01)

(52) U.S. Cl.
CPC ......... *H04N 19/159* (2014.11); *H04N 19/176* (2014.11); *H04N 19/423* (2014.11)

(56) References Cited

U.S. PATENT DOCUMENTS

| | | | |
|---|---|---|---|
| 11,070,815 | B2 | 7/2021 | Lai et al. |
| 2005/0013360 | A1* | 1/2005 | Kim ..................... H04N 19/162 375/240.03 |
| 2007/0047648 | A1* | 3/2007 | Tourapis ................ H04N 19/86 375/240.13 |
| 2008/0240245 | A1 | 10/2008 | Lee et al. |
| 2012/0307899 | A1 | 12/2012 | Kim et al. |
| 2014/0010283 | A1 | 1/2014 | Lim et al. |
| 2014/0072041 | A1* | 3/2014 | Seregin ................ H04N 19/176 375/240.13 |
| 2017/0251213 | A1* | 8/2017 | Ye ........................ H04N 19/513 |
| 2018/0249156 | A1 | 8/2018 | Heo et al. |
| 2018/0288410 | A1 | 10/2018 | Park et al. |
| 2018/0359470 | A1* | 12/2018 | Lee ...................... H04N 19/176 |
| 2018/0376148 | A1 | 12/2018 | Zhang et al. |
| 2019/0215521 | A1 | 7/2019 | Chuang et al. |
| 2019/0306513 | A1 | 10/2019 | Van Der Auwera et al. |
| 2020/0007895 | A1 | 1/2020 | Van Der Auwera et al. |
| 2020/0077089 | A1* | 3/2020 | Lee ...................... H04N 19/176 |
| 2020/0154114 | A1 | 5/2020 | Zhao et al. |
| 2020/0162737 | A1 | 5/2020 | Van Der Auwera et al. |
| 2020/0260091 | A1* | 8/2020 | Pham Van ........... H04N 19/159 |
| 2022/0007010 | A1 | 1/2022 | Van Der Auwera et al. |
| 2022/0030226 | A1 | 1/2022 | Lee et al. |
| 2022/0286680 | A1 | 9/2022 | Van Der Auwera et al. |

OTHER PUBLICATIONS

Bross B., et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, JVET-L1001-v9, Oct. 3-12, 2018, 235 pp.
Cha R., et al., "Improved Combined Inter-intra Prediction Using Spatial-Variant Weighted Coefficient," International Conference on Multimedia and Expo (ICME), Jul. 11, 2011, pp. 1-5, XP031964687, DOI: 10.1109/ICME.2011.6012008, ISBN: 978-1-61284-348-3, abstract.
Chen Y., et al., "Joint Inter-Intra Prediction based on Mode-variant and Edge-directed Weighting Approaches in Video Coding," IEEE International Conference on Acoustics, Speech and Signal Processing (ICASSP), May 4, 2014, pp. 7372-7376, XP032617571, [retrieved on Jul. 11, 2014], paragraphs [03.2], [03.3].
Chen J., et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.
Chen J., et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, JVET-L1002-v2, 12th Meeting: Macao, CN, Oct. 3-12, 2018, Doc: JVET-L1002, 48 pages.

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.
Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.
Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.
Chiang M., et al., "CE1 0.1.1: Multi-hypothesis Prediction for Improving AMVP Mode, Skip or Merge Mode, and Intra Mode," 12th JVET Meeting, Oct. 3, 2018-Oct. 12, 2018, Macao, (The Joint Video Exploration Team of ISO/IEC JTC1/SC29/WG11 and ITU-T SG.16), No. JVET-L0100, Oct. 12, 2018 (Oct. 12, 2018), XP030195410, 14 pages, Retrieved from the Internet: URL: http://phenix.int-evry.fr/jvet/doc_end_user/documents/12_Macao/wg11/JVET-L0100-v3.zip JVET-L0100-v3.docx, 14 pages, [retrieved on Oct. 12, 2018] paragraph [02.3].
Ergen S., "ZigBee/IEEE 802.15.4 Summary", Sep. 10, 2004, 37 Pages.
Hernández S-D., et al., "CE3: Line-based intra coding mode (Tests 2.1.1 and 2.1.2)", 12th JVET Meeting, Oct. 3, 2018- Oct. 12, 2018, Macao, CN, (The Joint Video Exploration Team of ISO/IEC JTC1/SC29/WG11 and ITU-T SG.16), No. JVET-L0076-V2, Fraunhofer HHI, pp. 1-10.
IEEE Computer Society; "Part 11: Wireless LAN Medium Access Control (MAC) and Physical Layer (PHY) Specifications: Amendment 4: Enhancements for Very High Throughput for Operation in Bands below 6 GHz", IEEE Standard for Information technology—Telecommunications and information exchange between systems Local and metropolitan area networks—Specific requirements; Sponsored by LAN/MAN Standards Committee; IEEE Standard 802.11acTM-2013, Published on Dec. 18, 2013, 425 Pages.
International Search Report and Written Opinion—PCT/US2019/061855—ISA/EPO—Feb. 21, 2020.
ITU-T H265, "Series H: Audiovisual and Multimedia Systems, Infrastructure of audiovisual services—Coding of moving video, High efficiency video coding," The International Telecommunication Union. Dec. 2016, 664 Pages.
Qualcomm: "Position Dependent Intra Prediction Combination", ITU-T SG16 Meeting, (Dec. 10, 2015)—(Oct. 23, 2015), Geneva, No. T13-SG16-C-1 046, Sep. 30, 2015 (Sep. 30, 2015), XP030100754, 5 pages, the whole document.
R-L Liao (Panasonic), et al., "CE10.3.1.b: Triangular Prediction Unit Mode", 12. JVET Meeting, Oct. 3, 2018-Oct. 12, 2018, Macao, (The Joint Video Exploration Team of ISO/IEC JTC 1/SC 29/WG 11 and ITU-T SG.16), No. JVET-L0124-V2, Nov. 1, 2018 (Nov. 1, 2018), XP030198593, 8 Pages Retrieved from the Internet: URL: http://phenix.int-evry.fr/jvet/doc_end_user/documents/12_Macao/wg11/JVET-L0124-v6.zip JVET-L0124-v2.doc [retrieved on Nov. 1, 2018], the whole document.
Van Der Auwera G., et al., "Extension of Simplified PDPC to Diagonal Intra Modes", 10th JVET Meeting, Oct. 4, 2018—Apr. 20, 2018, San Diego, (The Joint Video Exploration Team of ISO/IEC JTC1/SC29/WG11 and ITU-T SG.16), JVET-J0069_r1, Apr. 2018, pp. 1-4.
Van L P., (Qualcomm) et al., "CE10-related: Inter-Intra Prediction Combination", 13. JVET Meeting; Jan. 9, 2019-Jan. 18, 2019; Marrakech; (The Joint Video Exploration Team of ISO/IEC JTC1/SC29/WG11 and ITU-TSG.16), No. JVET-M0096, Jan. 10, 2019 (Jan. 10, 2019), 5 Pages, XP030201275, Retrieved from the Inter-

(56) References Cited

OTHER PUBLICATIONS net: URL: http://phenix.int-evry.fr/jvet/doc_end_user/documents/13_Marrakechjwg11/JVET-M0096-v4.zip JVET-M0096 v3.pptx, [retrieved on Jan. 10, 2019].

Zhao L., et al., "Non-CE: Weighted Intra and Inter Prediction Mode", Joint Video Experts Team (JVET) of ITU-T SG 16 WP 3 and ISO/IEC JTC 1/SC 29/WG 11, JVET-O0537, 15th Meeting: Gothenburg, SE, Jul. 3-12, 2019, Doc: JVET-O0537, pp. 1-6.

Zhao L., et al., "CE3-related: Unification of Angular Intra Prediction for Square and Non-square Blocks," 12, JVET Meeting, Oct. 3, 2018-Oct. 12, 2018, Macao, (The Joint Video Exploration Team of ISO/IEC JTC1/SC29/WG11 and ITU-T SG.16 ), No. JVET-L0279, Oct. 6, 2018 (Oct. 6, 2018), XP030195082, pp. 1-10, Retrieved from the Internet: URL: http://phenix.int-evry.fr/jvet/doc_end_user/documents/12_Macao/wg11/JVET-L0279-v3.zip JVET-L0279-v1.docx [retrieved on Oct. 6, 2018] cited in the application the whole document.

Zhao X., et al., "EE1 Related: Simplification and Extension of PDPC", 8th JVET Meeting; Oct. 18, 2017-Oct. 25, 2017; Macau; (The Joint Video Exploration Team of ISO/IEC JTC1/SC29/WG11 and ITU-T SG.16); URL: http://phenix.int-evry.fr/jvet/,,No. JVET-H0057-r1, Oct. 11, 2017, XP030151049, cited in the application, Section 1 Proposed method, 4 pages.

Van L P., et al., "CE10: CIIP with Position-independent Weights (Test CE10-1.1)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0302_v1, pp. 1-3.

De Rivaz., et al., "AV1 Bitstream & Decoding Process Specification", The Alliance for Open Media, Jun. 25, 2018, 677 Pages.

Office Action from U.S. Appl. No. 16/684,379, dated Jan. 27, 2022, 22 pp.

Certified Copy of KR1020180112011, filed on Sep. 19, 2018, 161 Pages.

Certified Copy of KR1020180114690, filed on Sep. 27, 2018, 160 Pages.

Certified Copy of KR1020180137879, filed on Nov. 12, 2018, 171 Pages.

* cited by examiner

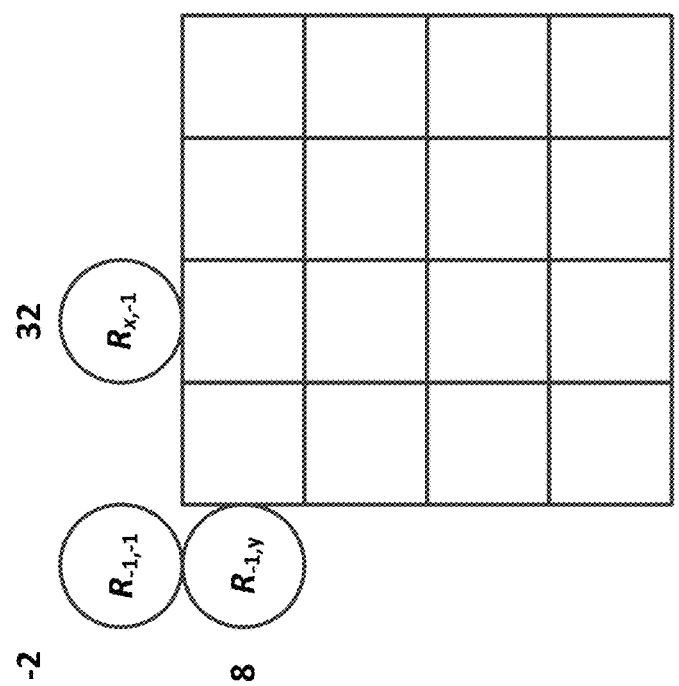
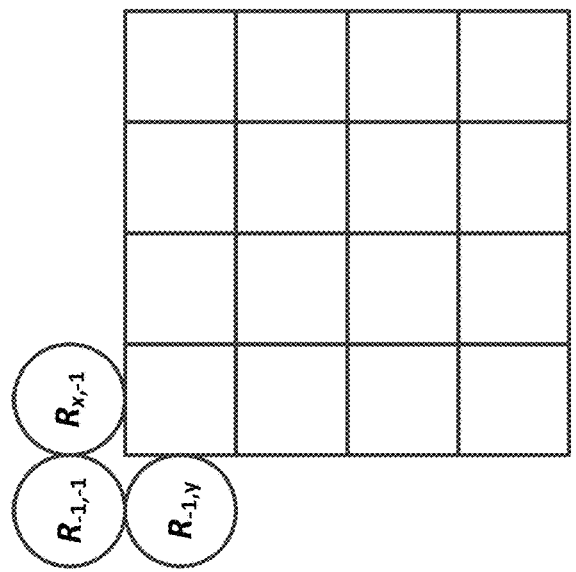
FIG. 2

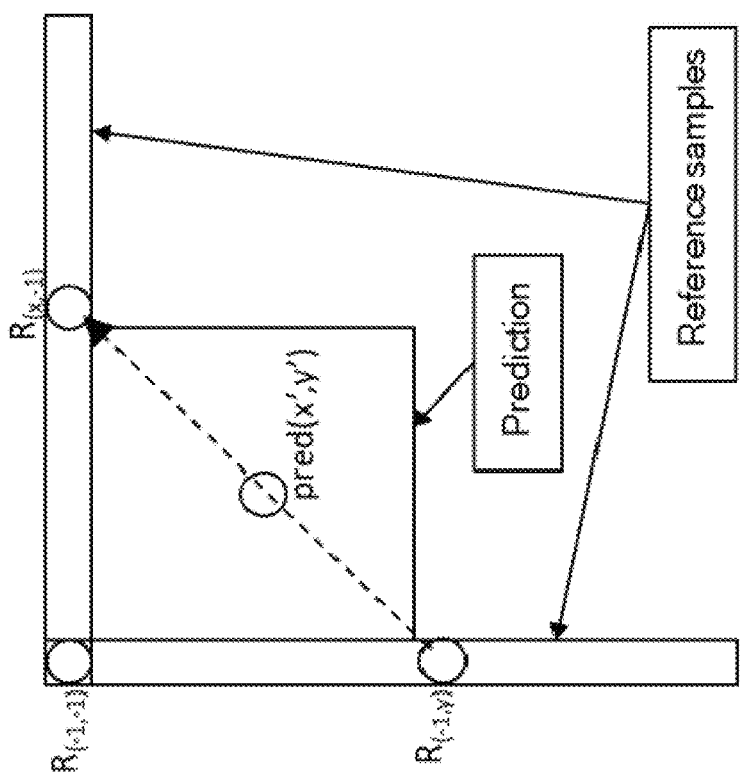
FIG. 4B  Diagonal bottom-left mode
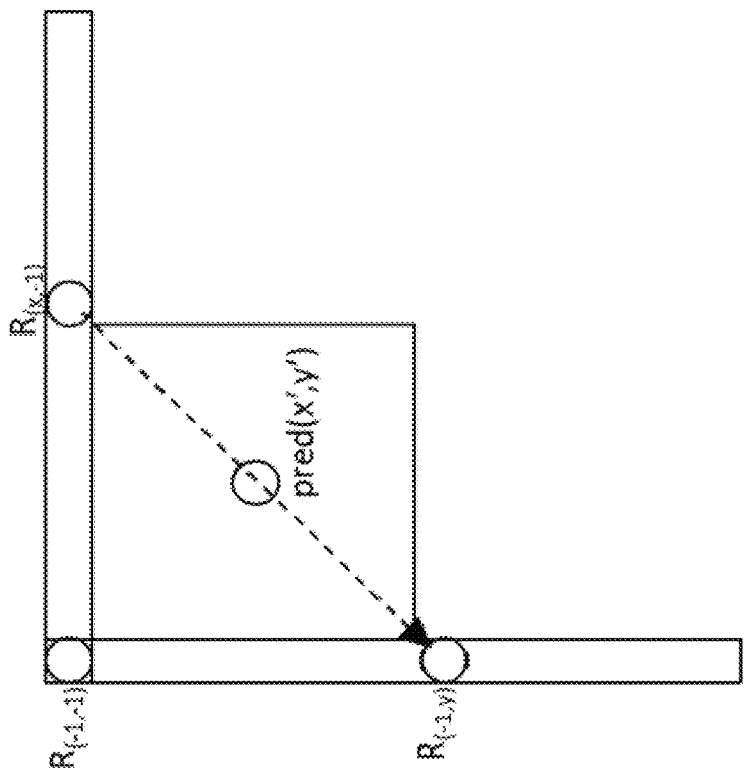
FIG. 4A  Diagonal top-right mode

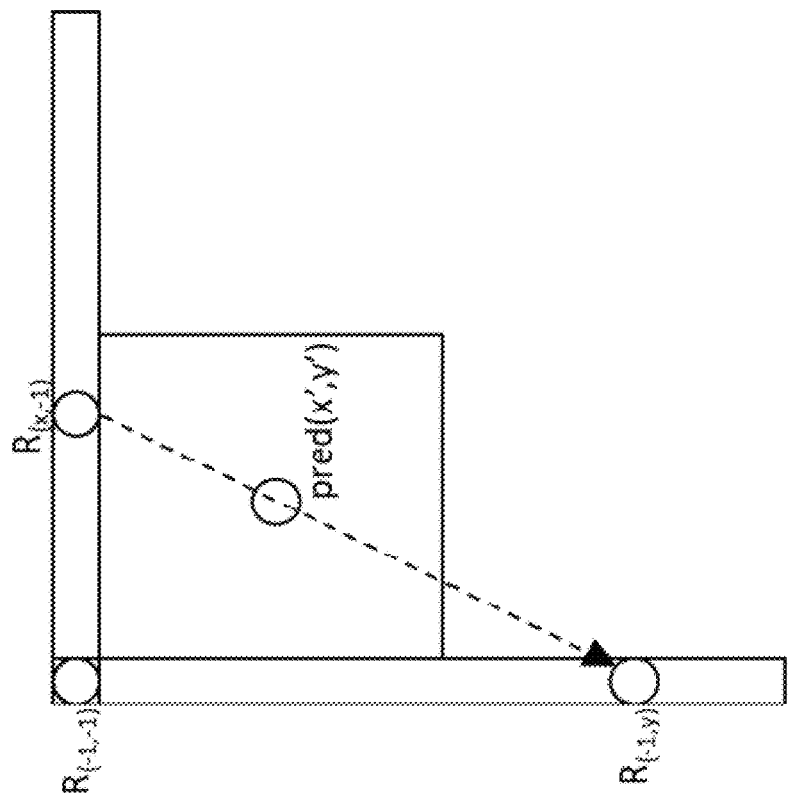
FIG. 4D Adjacent diagonal bottom-left mode
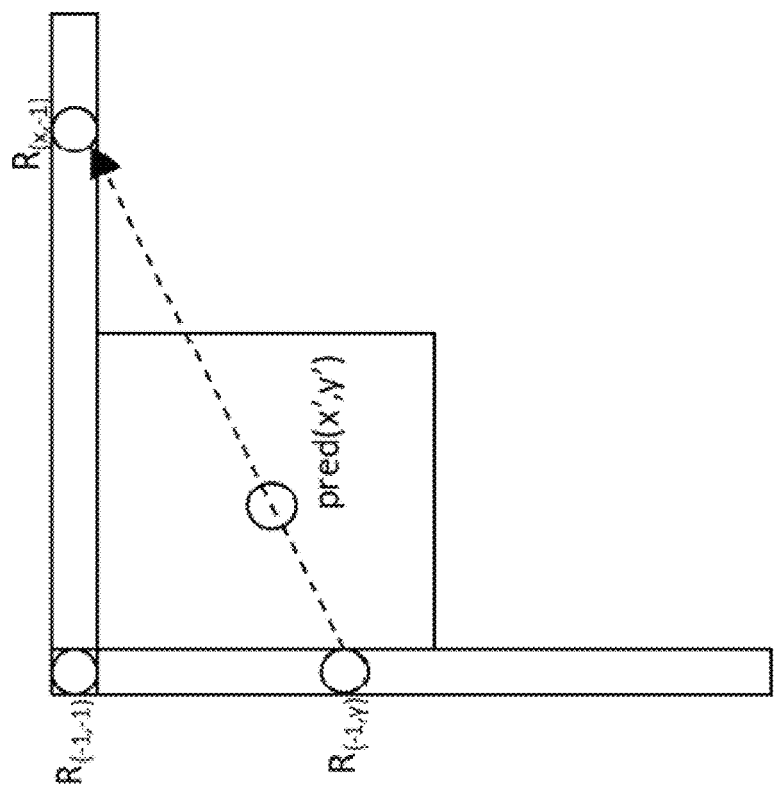
FIG. 4C Adjacent diagonal top-right mode

FIG. 12

POSITION-DEPENDENT INTRA-INTER PREDICTION COMBINATION IN VIDEO CODING

This application claims the benefit of U.S. Provisional Application Nos. 62/768,655, filed Nov. 16, 2018, and 62/784,140, filed Dec. 21, 2018, the entire contents of each of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, smart phones, video teleconferencing devices, video streaming devices, and the like. Digital video devices implement video compression techniques, such as those described in the standards defined by ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC) with its extensions, MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques. During the April 2018 meeting of the Joint Video Experts Team (WET), the Versatile Video Coding (VVC) standardization activity (also known as ITU-T H.266) commenced, with the evaluation of the video compression technologies submitted in response to the Call for Proposals.

Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a prediction block for a block to be coded. Residual data represents pixel differences between the original block to be coded and the prediction block. For further compression, the residual data may be transformed from the pixel domain to a transform domain, resulting in residual transform coefficients, which then may be quantized.

SUMMARY

This disclosure generally describes various techniques related to improving position dependent intra prediction combination (PDPC). In general, PDPC involves generating an intra-prediction block and an inter-prediction block for a current block, and then generating a prediction block from a combination of the intra-prediction block and the inter-prediction block. For example, this disclosure describes a technique for calculating position-independent weights to be applied to samples of the intra-prediction block and the inter-prediction block during the combination process, e.g., according to a number of neighboring blocks that are inter- or intra-predicted.

In one example, a method of coding (encoding or decoding) video data includes determining a first number of neighboring blocks to a current block that are intra-predicted; determining a second number of the neighboring blocks that are inter-predicted; determining a first weight value to be applied to intra-prediction samples of an intra-prediction block for the current block according to the first number and the second number; determining a second weight value to be applied to inter-prediction samples of an inter-prediction block for the current block according to the first number and the second number; generating a prediction block for the current block as a weighted combination of the intra-prediction block to which the first weight value is applied and the inter-prediction block to which the second weight value is applied; and coding the current block using the prediction block.

In another example, a device for coding (encoding or decoding) video data includes a memory configured to store video data; and one or more processors implemented in circuitry and configured to: determine a first number of neighboring blocks to a current block of the video data that are intra-predicted; determine a second number of the neighboring blocks that are inter-predicted; determine a first weight value to be applied to intra-prediction samples of an intra-prediction block for the current block according to the first number and the second number; determine a second weight value to be applied to inter-prediction samples of an inter-prediction block for the current block according to the first number and the second number; generate a prediction block for the current block as a weighted combination of the intra-prediction block to which the first weight value is applied and the inter-prediction block to which the second weight value is applied; and code the current block using the prediction block.

In another example, a computer-readable storage medium has stored thereon instructions that, when executed, cause a processor to: determine a first number of neighboring blocks to a current block that are intra-predicted; determine a second number of the neighboring blocks that are inter-predicted; determine a first weight value to be applied to intra-prediction samples of an intra-prediction block for the current block according to the first number and the second number; determine a second weight value to be applied to inter-prediction samples of an inter-prediction block for the current block according to the first number and the second number; generate a prediction block for the current block as a weighted combination of the intra-prediction block to which the first weight value is applied and the inter-prediction block to which the second weight value is applied; and code (encode or decode) the current block using the prediction block.

In another example, a device for coding (encoding or decoding) video data includes means for determining a first number of neighboring blocks to a current block that are intra-predicted; means for determining a second number of the neighboring blocks that are inter-predicted; means for determining a first weight value to be applied to intra-prediction samples of an intra-prediction block for the current block according to the first number and the second number; means for determining a second weight value to be applied to inter-prediction samples of an inter-prediction block for the current block according to the first number and the second number; means for generating a prediction block for the current block as a weighted combination of the intra-prediction block to which the first weight value is applied and the inter-prediction block to which the second weight value is applied; and means for coding the current block using the prediction block.

The details of one or more examples are set forth in the accompanying drawings and the description below. Other features, objects, and advantages will be apparent from the description, drawings, and claims.

BRIEF DESCRIPTION OF DRAWINGS

FIG. 2 is a diagram illustrating examples of DC mode position-dependent prediction combination (PDPC) weights for (0, 0) and (1, 0) positions inside one 4×4 block.

FIGS. 4A-4D are diagrams illustrating various PDPC definitions.

FIG. 12 is a conceptual diagram representing an example of position dependent weights for an 8×8 block.

DETAILED DESCRIPTION

Figure 1:
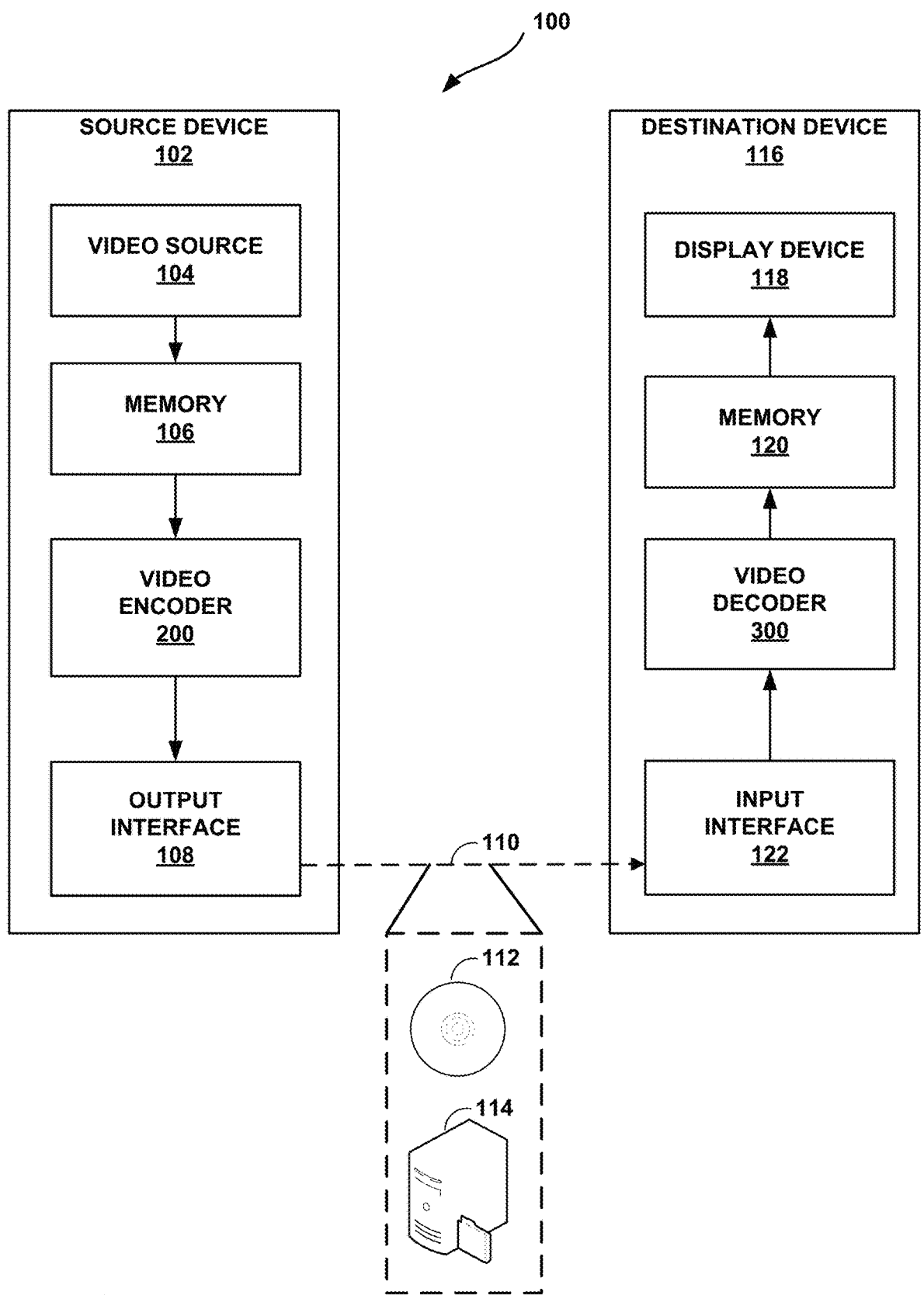
FIG. 1 is a block diagram illustrating an example video encoding and decoding system that may perform one or more techniques described in this disclosure.

A video coder (e.g., a video encoder or a video decoder) may use intra prediction to generate a prediction block for a current block of a current picture. In general, when using intra prediction to generate a prediction block, the video coder determines a set of reference samples in a column left of the current block in the current picture and/or in a row above the current block in the current picture. The video coder may then use the reference samples to determine values of samples in the prediction block.

In High Efficiency Video Coding (HEVC) and other video coding standards, the video coder performs intra reference smoothing, also known as mode-dependent intra smoothing (MDIS). When the video coder performs intra reference smoothing or MDIS, the video coder applies a filter to the reference samples prior to using the reference samples to determine predicted values of samples in the prediction block. For instance, the video coder may apply a 2-tap linear filter or a 3-tap (1,2,1)/4 filter to the reference samples. In the filter description above, the '4' denotes normalization by dividing results by 4. Typically, performing intra reference smoothing improves prediction accuracy, especially when the current block represents a smoothly varying gradient.

While MDIS may improve prediction accuracy in many situations, there are other situations in which it may be beneficial to use the unfiltered reference samples. Position-dependent prediction combination (PDPC) is a scheme that has been devised to address these issues and improve intra prediction. In the PDPC scheme, a video coder determines a value of a prediction block sample based on the filtered reference samples, unfiltered reference samples, and the position of the prediction block sample within the prediction block. Use of the PDPC scheme may be associated with coding efficiency gains. For instance, the same amount of video data may be encoded using fewer bits.

Block-based intra prediction is part of video standards such as AVC, HEVC, VVC (currently under development), etc. Typically, lines of reference samples from adjacent reconstructed blocks are used for predicting samples within the current block. One or multiple lines of samples may be used for prediction. The reference samples are employed by typical intra prediction modes such as DC, planar, and angular/directional modes.

PDPC was proposed in ITU-T SG16/Q6 Doc. COM16-C1046, "Position Dependent intra Prediction Combination (PDPC)" and further simplified in "EE1 related: Simplification and extension of PDPC," 8th JVET Meeting, Macau, October 2018, JVET-H0057 by X. Zhao, V. Seregin, A. Said, and M. Karczewicz. In "Description of SDR, HDR and 360° video coding technology proposal by Qualcomm," $10^{th}$ JVET Meeting, San Diego, Calif., USA, April 2018, JVET-J0021 by M. Karczewicz et al, which is a submission to JVET's call for proposals, PDPC is applied to planar, DC, horizontal and vertical modes without signaling as summarized in the following. In "Extension of Simplified PDPC to Diagonal Intra Modes," 10th JVET Meeting, San Diego, Calif., USA, April 2018, JVET-J0069 by G. Van der Auwera, V. Seregin, A. Said, M. Karczewicz, PDPC was further extended to diagonal directional modes and modes adjacent to diagonal directional modes.

This disclosure describes techniques and system configurations that may address the following potential issues. First, a potential problem is that PDPC is applied before the intra-inter blending step, which may adversely affect coding efficiency and implementation complexity. Second, in case of triangular motion compensated prediction, the two triangular prediction units are only applied to a motion-compensated or inter-predicted CU. Blending of one intra and one inter triangular prediction unit is not supported. There exist ambiguities with respect to how PDPC together with blending is applied in this case. Third, the MDIS filtering may be applied to the reference samples for intra prediction before intra-inter blending, which may adversely affect coding efficiency and implementation complexity. The details of one or more aspects of the disclosure are set forth in the accompanying drawings and the description below. Other features, objects, and advantages of the techniques described in this disclosure will be apparent from the description, drawings, and the claims.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for cross-component prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for cross-component prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 include video encoding and decoding components. Hence, system 100 may support one-way or two-way video transmission between video source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include one or both of a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream of computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry (e.g., processing circuitry), such as one or more microprocessors, digital signal processors (DSPs), application specific integrated circuits (ASICs), field programmable gate arrays (FPGAs), discrete logic, fixed function circuitry, programmable processing circuitry, hardware, firmware, hardware implementing software, or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or VVC. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

In some examples, e.g., according to the techniques of this disclosure, video encoder 200 and video decoder 300 may perform position-dependent intra prediction combination (PDPC). That is, video encoder 200 and video decoder 300 may generate a prediction block for a current block using a combination of both an intra-prediction block and an inter-prediction block for the current block. In some examples, video encoder 200 and video decoder 300 may generate the prediction block as a weighted combination of samples of the intra-prediction block and the inter-prediction block.

Video encoder 200 and video decoder 300 may determine weights to be applied to the intra-prediction block and the inter-prediction block on a position-independent basis, e.g., based on a number of intra- and inter-predicted blocks neighboring the current block. For example, video encoder 200 and video decoder 300 may determine whether either or both of an above-neighboring block and a left-neighboring block to the current block is intra-predicted or inter-predicted. When both the above-neighboring block and the left-neighboring block are intra-predicted, video encoder 200 and video decoder 300 may determine a larger weight to be applied to the intra-prediction block than the inter-predicted block, e.g., a weight of 3 to be applied to the intra-prediction block and a weight of 1 to be applied to the inter-prediction block. When both the above-neighboring block and the left-neighboring block are inter-predicted, video encoder 200 and video decoder 300 may determine a larger weight to be applied to the inter-prediction block than the intra-predicted block, e.g., a weight of 3 to be applied to the inter-prediction block and a weight of 1 to be applied to the intra-prediction block. When one of the above-neighboring block and the left-neighboring block is intra-predicted and the other of the above-neighboring block and the left-neighboring block is inter-predicted, video encoder 200 and video decoder 300 may determine equal weights to be applied to the inter-prediction block and the intra-predicted block, e.g., weights of 2 for each of the inter-prediction block and the intra-predicted block.

After determining the weights, video encoder 200 and video decoder 300 may generate a prediction block by applying the weights to respective samples of the intra-prediction block and the inter-prediction block. The weights may be position-independent. Thus, video encoder 200 and video decoder 300 may apply the weight for the intra-prediction block to each sample of the intra-prediction block and the weight for the inter-prediction block to each sample of the inter-prediction block. Video encoder 200 and video decoder 300 may add the weighted samples of the intra-prediction block and the inter-predicted block on a sample-by-sample basis. Furthermore, video encoder 200 and video decoder 300 may divide the resulting values by the sum of the weights. In some examples, rather than performing a division operation, video encoder 200 and video decoder 300 may ensure that the sum of the weights is a multiple of two, and then perform a bitwise right-shift operation according to the sum of the weights. For example, for a sum of the weights equal to four, video encoder 200 and video decoder 300 may perform a bitwise right shift by 2 bits.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

According to aspects of PDPC, the prediction sample pred(x,y) located at (x, y) is predicted with an intra prediction mode (DC, planar, angular) and its value is modified using the PDPC expression for a single reference sample line, e.g., as follows:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6, \quad (\text{Eq. 1})$$

where $R_{x,-1}$, $R_{-1,y}$ represent the reference samples located at the top and left of current sample (x, y), respectively, and $R_{-1,-1}$ represents the reference sample located at the top-left corner of the current block. For the DC mode, the weights are calculated as follows for a block with dimensions width and height:

$$wT=32>>((y<<1)>>\text{shift}), wL=32>>((x<<1)>>\text{shift}),$$
$$wTL=(wL>>4)+(wT>>4),$$

with shift=$(\log_2(\text{width})+\log_2(\text{height})+2)>>2$, while for planar mode wTL=0, for horizontal mode wTL=wT and for vertical mode wTL=wL. The PDPC weights can be calculated with adds and shifts only. The value of pred(x,y) can be computed in a single step using Eq. 1.

FIG. 2 is a diagram illustrating examples of DC mode PDPC weights (wL, wT, wTL) for (0, 0) and (1, 0) positions inside one 4×4 block. If PDPC is applied to DC, planar, horizontal, and vertical intra modes, additional boundary filters are not applied, such as the DC mode boundary filter or horizontal/vertical mode edge filters. The Eq. 1 equation may be generalized to include additional reference sample lines. In this case, multiple reference samples are available in the neighborhoods of $R_{x,-1}$, $R_{-1,y}$, $R_{-1,-1}$ and each may have a weight assigned that can be optimized, for example, by training.

U.S. Provisional Patent Application No. 62/651,424 (filed on 2 Apr. 2018, the entire content of which is incorporated herein by reference) extends PDPC to diagonal intra modes and to the angular modes that are adjacent to the diagonal modes. The intended diagonal intra modes are the modes that predict according to the bottom-left and top-right directions, as well as several adjacent angular modes, for example, N adjacent modes between the bottom-left diagonal mode and vertical mode, and N or M adjacent modes between the top-right diagonal mode and horizontal mode.

Figure 3:
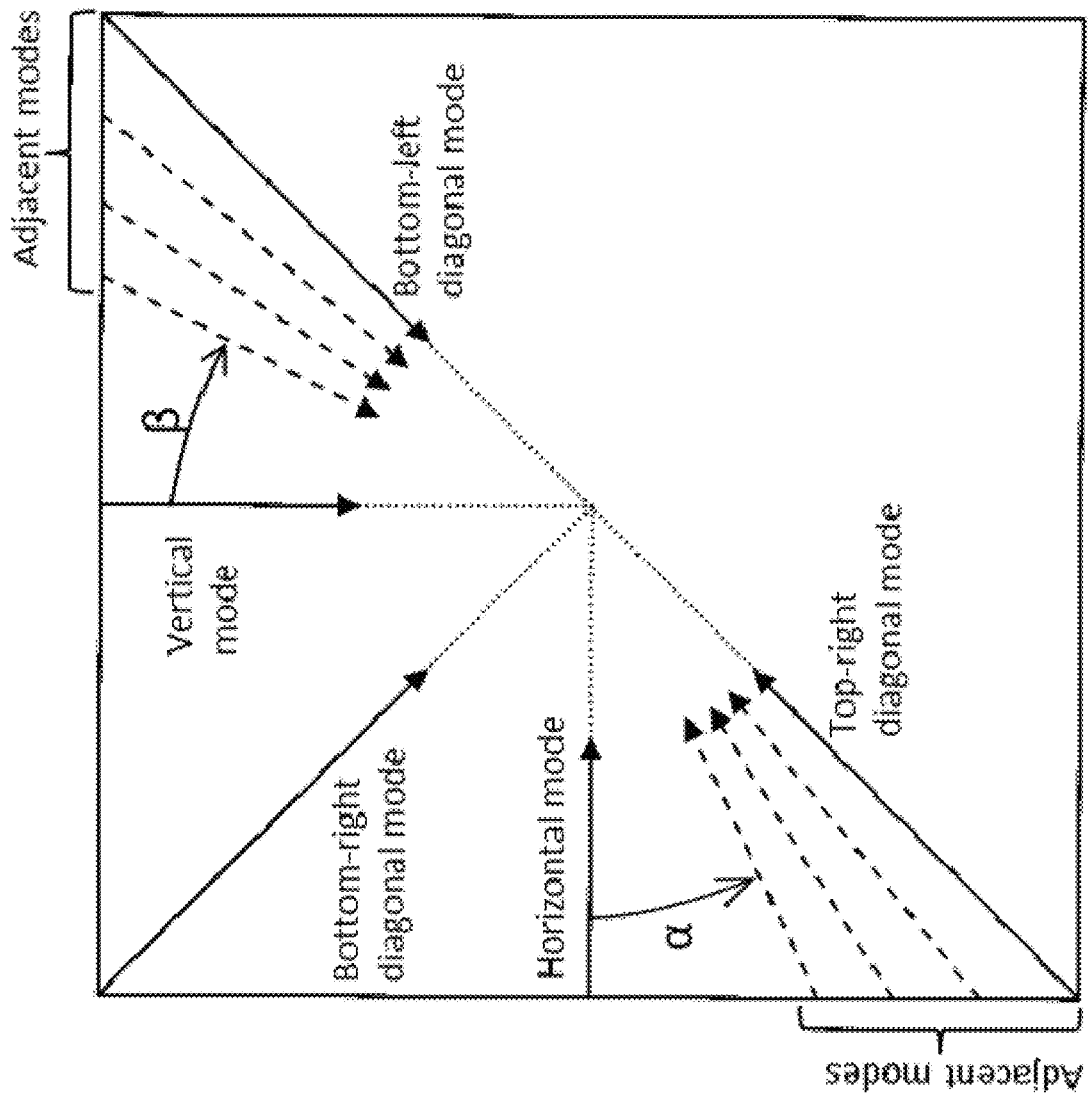
FIG. 3 is a diagram illustrating example intra prediction modes.

FIG. 3 is a diagram illustrating the identification of the angular modes. In general, the adjacent modes may be a selected subset of available angular modes. The spacing between angular modes may be nonuniform and some angular modes may be skipped.

FIGS. 4A-4D are diagrams illustrating various PDPC definitions. FIG. 4A illustrates the definition of reference samples $R_{x,-1}$, $R_{-1,y}$, and $R_{-1,-1}$ for the extension of PDPC to the top-right diagonal mode. The prediction sample pred(x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1. The PDPC weights for the top-right diagonal mode are, for example:

$$wT=16>>((y'<<1)>>\text{shift}), wL=16>>((x'<<1)>>\text{shift}), wTL=0.$$

Similarly, FIG. 4B illustrates the definition of reference samples $R_{x,-1}$, $R_{-1,y}$, and $R_{-1,-1}$ for the extension of PDPC to the bottom-left diagonal mode. The coordinate x of the reference sample $R_{x,-1}$ is given by: x=x'+y'+1, and the coordinate y of the reference sample $R_{-1,y}$ is: y=x'+y'+1. The PDPC weights for the top-right diagonal mode are, for example:

$$wT=16>>((y'<<1)>>\text{shift}), wL=16>>((x'<<1)>>\text{shift}), wTL=0.$$

The case of an adjacent top-right diagonal mode is illustrated in FIG. 4C. In general, for the angle α defined in FIG. 3, they coordinate of the reference sample $R_{-1,y}$ is determined as follows: y=y'+tan(α)×(x'+1), and the x coordinate of $R_{x,-1}$ is given by: x=x'+cotan(α)×(y'+1), with tan(a) and cotan(a) the tangent and cotangent of the angle α, respectively. The PDPC weights for an adjacent top-right diagonal mode are, for example:

$$wT=32>>((y'<<1)>>\text{shift}), wL=32>>\\ ((x'<<1)>>\text{shift}), wTL=0, \quad \text{or} \quad wT=32>>\\ ((y'<<1)>>\text{shift}), wL=0, wTL=0.$$

Similarly, the case of an adjacent bottom-left diagonal mode is illustrated in FIG. 4D. In general, for the angle β defined in FIG. 3, the x coordinate of the reference sample $R_{x,-1}$ is determined as follows: x=x'+tan(β)×(y'+1), and they coordinate of $R_{-1,y}$ is given by: y=y'+cotan(β)×(x'+1), with tan(β) and cotan(β) the tangent and cotangent of the angle β, respectively. The PDPC weights for an adjacent bottom-left diagonal mode are, for example:

$$wL=32>>((x'<<1)>>\text{shift}), wT=32>>\\ ((y'<<1)>>\text{shift}), wTL=0, \quad \text{or} \quad wL=32>>\\ ((x'<<1)>>\text{shift}), wT=0, wTL=0.$$

As is the case for DC, planar, horizontal and vertical mode PDPC, there is no additional boundary filtering, for example specified in "Algorithm description of Joint Exploration Test Model 7," 7th JVET Meeting, Torino, Italy, July 2017, JVET-G1001 by J. Chen, E. Alshina, G. J. Sullivan, J.-R. Ohm, and J. Boyce.

Figure 5:
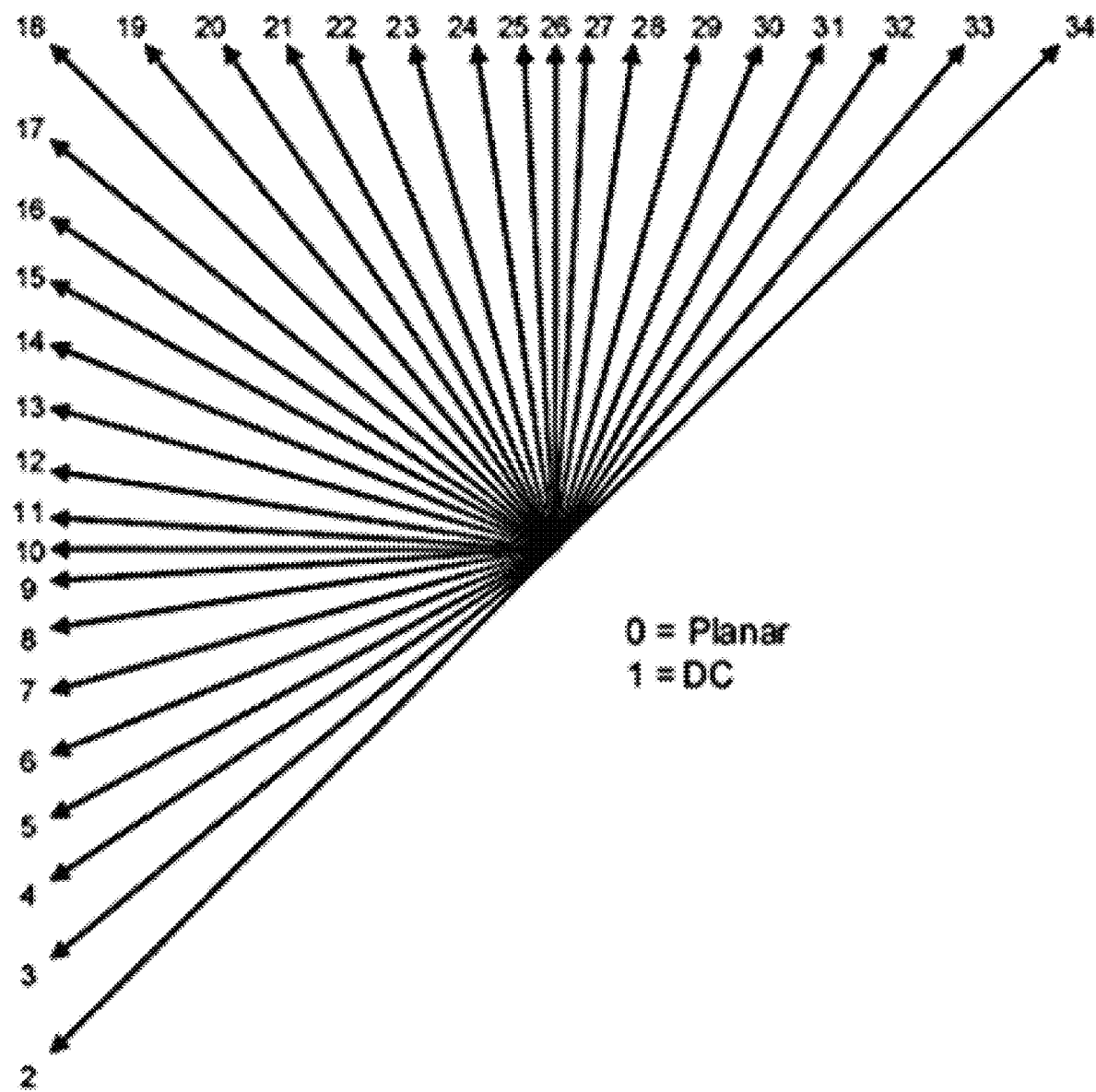
FIG. 5 is a diagram illustrating example intra prediction modes.

FIG. 5 is a diagram illustrating example intra prediction modes. An example of intra prediction is wide-angle intra prediction. In some examples, the intra prediction of a luma block includes 35 modes, including the Planar prediction mode, DC prediction mode and 33 angular (or directional) prediction modes. Directional prediction for square blocks uses directions between −135 degrees to 45 degrees of the current block in the VVC test model 2 (VTM2) (see "Algorithm description for Versatile Video Coding and Test Model 2 (VTM2)," 11th JVET Meeting, Ljubljana, S I, July 2018, WET-K1002 by J. Chen, Y. Ye, and S. Kim), as illustrated in FIG. 5. The 35 modes of the intra prediction are indexed as shown in Table 1 below.

TABLE 1

Specification of intra prediction mode and associated names

| Intra prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

In VTM2, the block structure used for specifying the prediction block for intra prediction is not restricted to be square (width w=height h). Rectangular prediction blocks (w>h or w<h) can increase the coding efficiency based on the characteristics of the content.

In such rectangular blocks, restricting the direction of intra prediction to be within −135 degrees to 45 degrees can result in situations where farther reference samples are used rather than closer reference samples for intra prediction. Such a design is likely to have an impact on the coding efficiency. It may be more beneficial to have the range of restrictions relaxed so that closer reference samples (beyond the −135 to 45-degree angle) be used for prediction. An example of such a case is given in FIG. 6.

Figure 6:
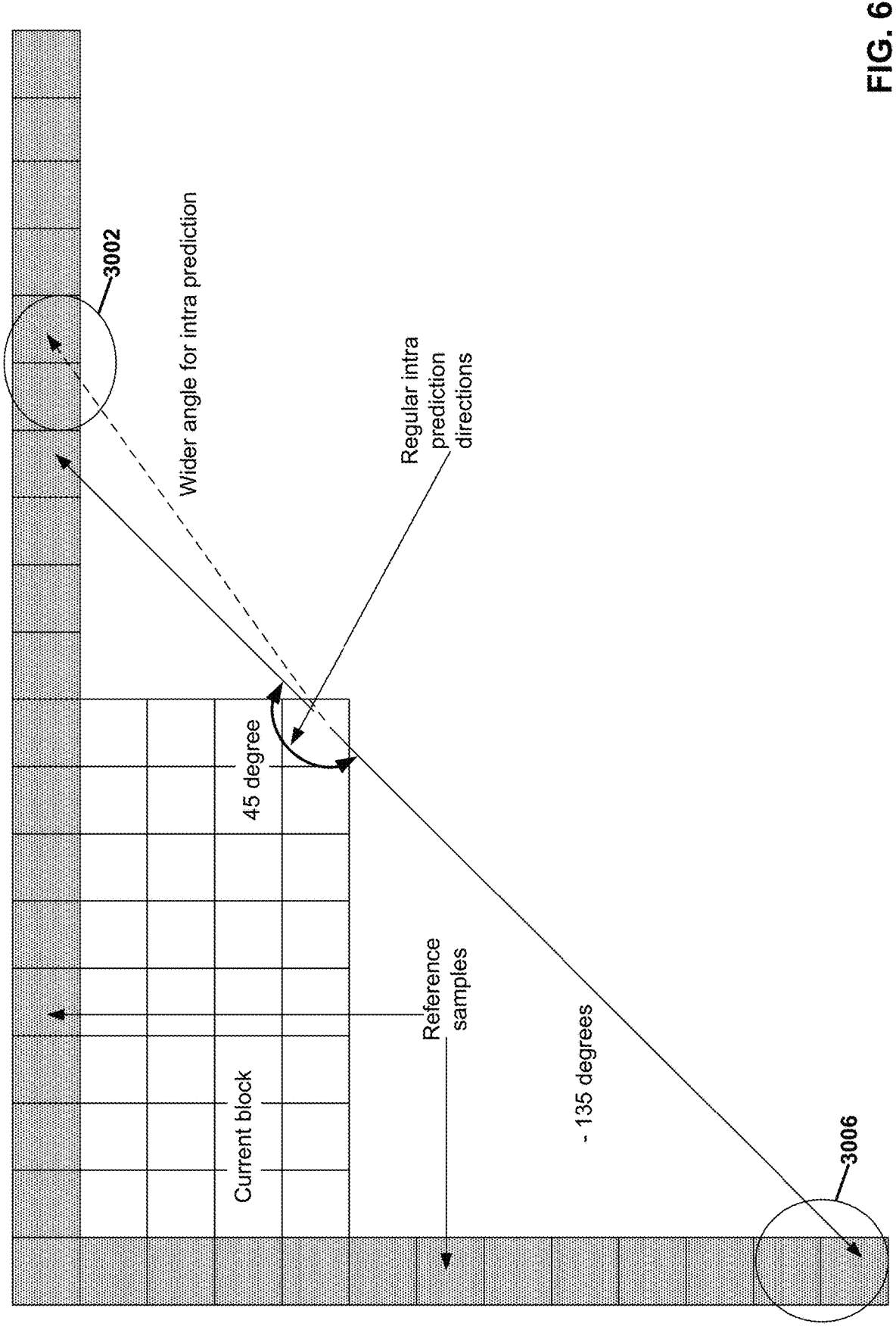
FIG. 6 is a block diagram illustrating an example of an 8×4 rectangular block.

FIG. 6 is a block diagram illustrating an example of an 8×4 rectangular block. in In the example of FIG. 6, "closer" reference samples (indicated by circle 3002) are not used, but "farther" reference samples (indicated by circle 3006) may be used, due to restriction of intra prediction direction to be in the range of −135 degrees to 45 degrees. That is, in the example of FIG. 6, some reference samples within −135 degrees but farther than those indicated by circle 3002 may be used, while some reference samples are not used although they are closer than other samples, e.g., closer than the samples indicated by circle 3006.

Figure 7A:
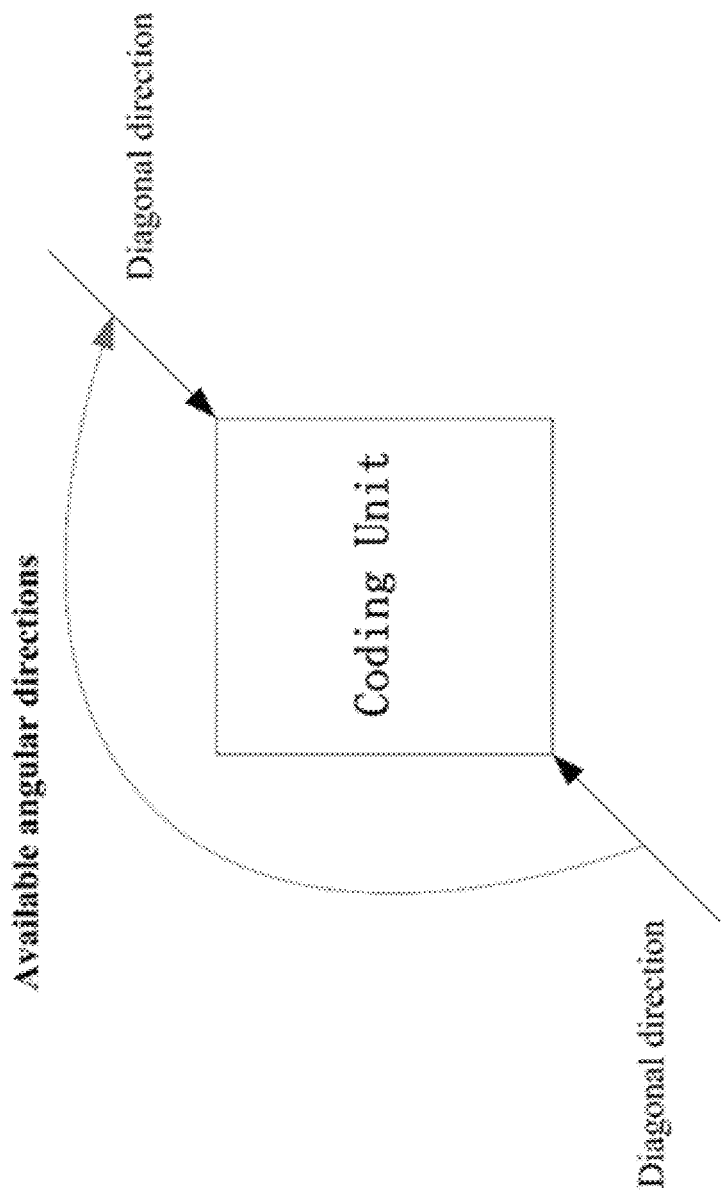
FIGS. 7A-7C are block diagrams illustrating example mode mapping processes for modes outside the diagonal direction range.
Figure 7B:
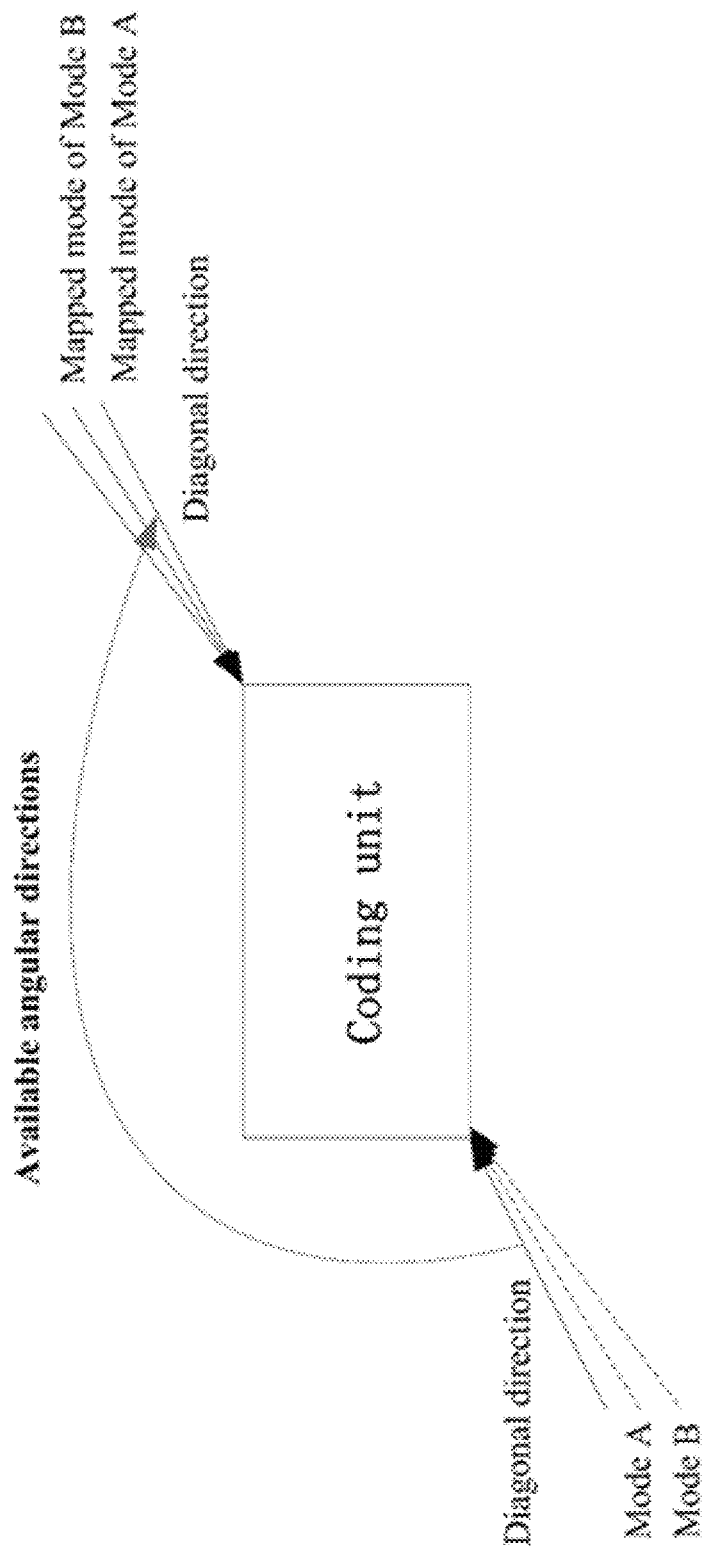
Figure 7C:
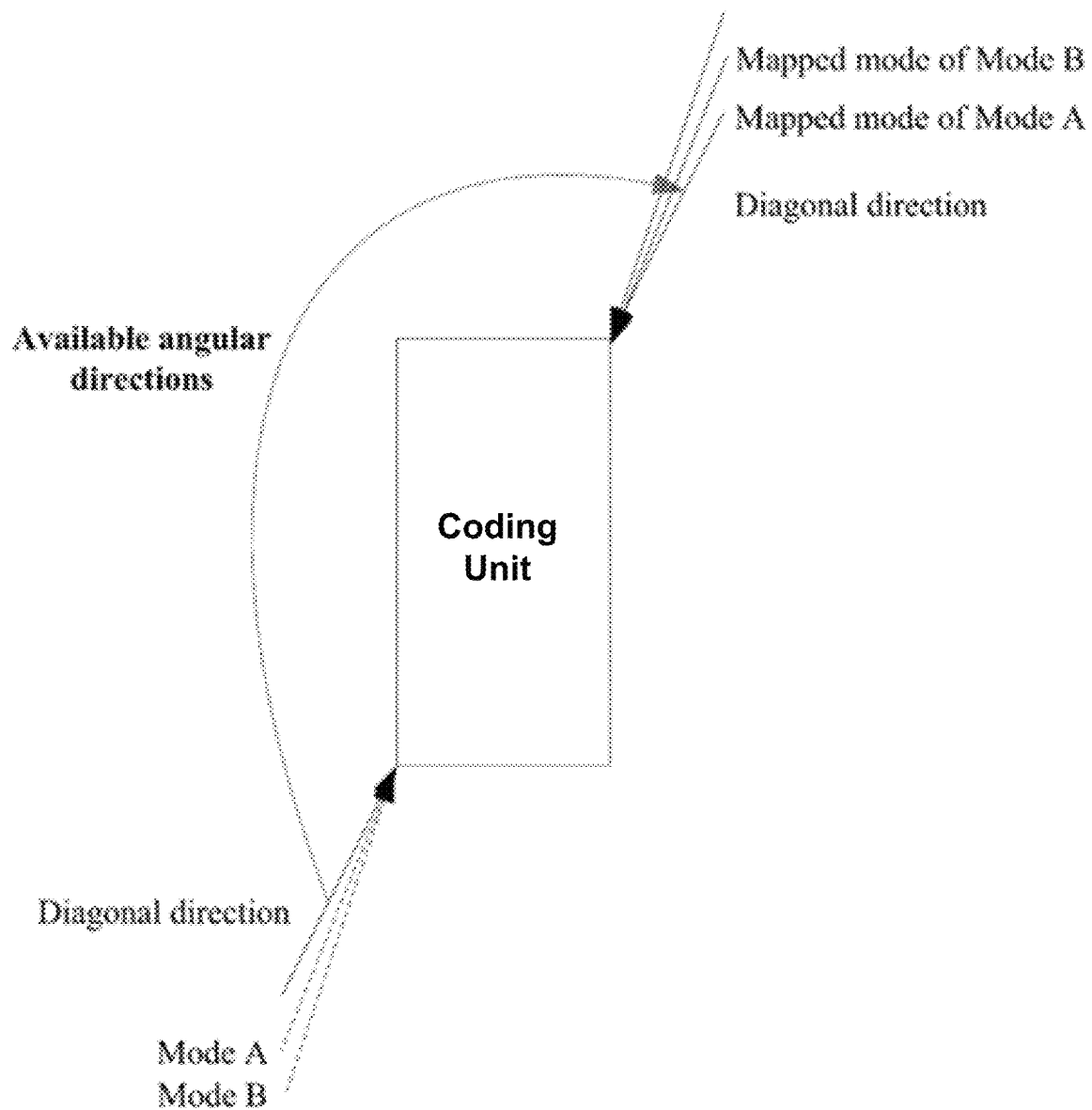

FIGS. 7A-7C are block diagrams illustrating example mode mapping processes for modes outside the diagonal direction range. In the example of FIG. 7A, a square block does not require angular mode remapping. The example of FIG. 7B illustrates angular mode remapping for a horizontal non-square block. FIG. 7C illustrates angular mode remapping for a vertical non-square block.

Figure 8:
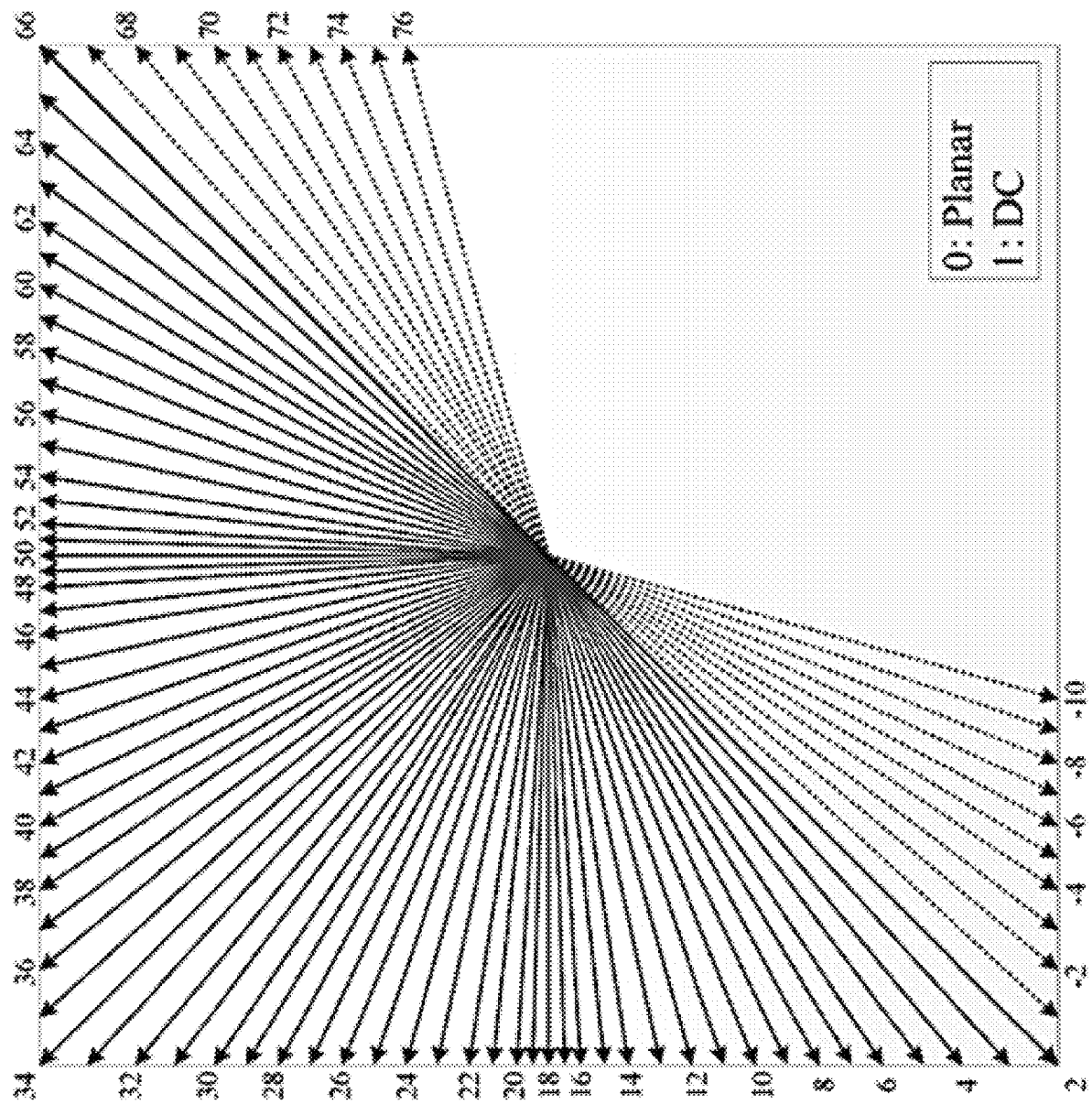
FIG. 8 is a conceptual diagram illustrating wide angles that are adopted in VTM2.

FIG. 8 is a conceptual diagram illustrating wide angles that are adopted in VTM2. During the 12th JVET meeting, a modification of wide-angle intra prediction was adopted into VVC test model 3 (VTM3), details of which are available from (i) "CE3-related: Unification of angular intra prediction for square and non-square blocks," 12th JVET Meeting, Macau SAR, CN, October 2018, JVET-L0279 by L. Zhao, X. Zhao, S. Liu, and X. Li; (ii) "Algorithm description for Versatile Video Coding and Test Model 3 (VTM3)," 12th JVET Meeting, Macau SAR, CN, October 2018, JVET-L1002 by J. Chen, Y. Ye, and S. Kim; and (iii) "Versatile Video Coding (Draft 3)," 12th JVET Meeting, Macau SAR, CN, October 2018, JVET-L1001 by B. Bross, J. Chen, and S. Liu.

This adoption includes two modifications to unify the angular intra prediction for square and non-square blocks. First, angular prediction directions are modified to cover diagonal directions of all block shapes. Second, all angular directions are kept within the range between the bottom-left diagonal direction and the top-right diagonal direction for all block aspect ratios (square and non-square) as illustrated in FIG. 7 and described above. In addition, the number of reference samples in the top reference row and left reference column are restricted to 2*width+1 and 2*height+1 for all block shapes. In the example of FIG. 8, wide angles (−1 to −10, and 67 to 76) are depicted in addition to the 65 angular modes.

Figure 9:
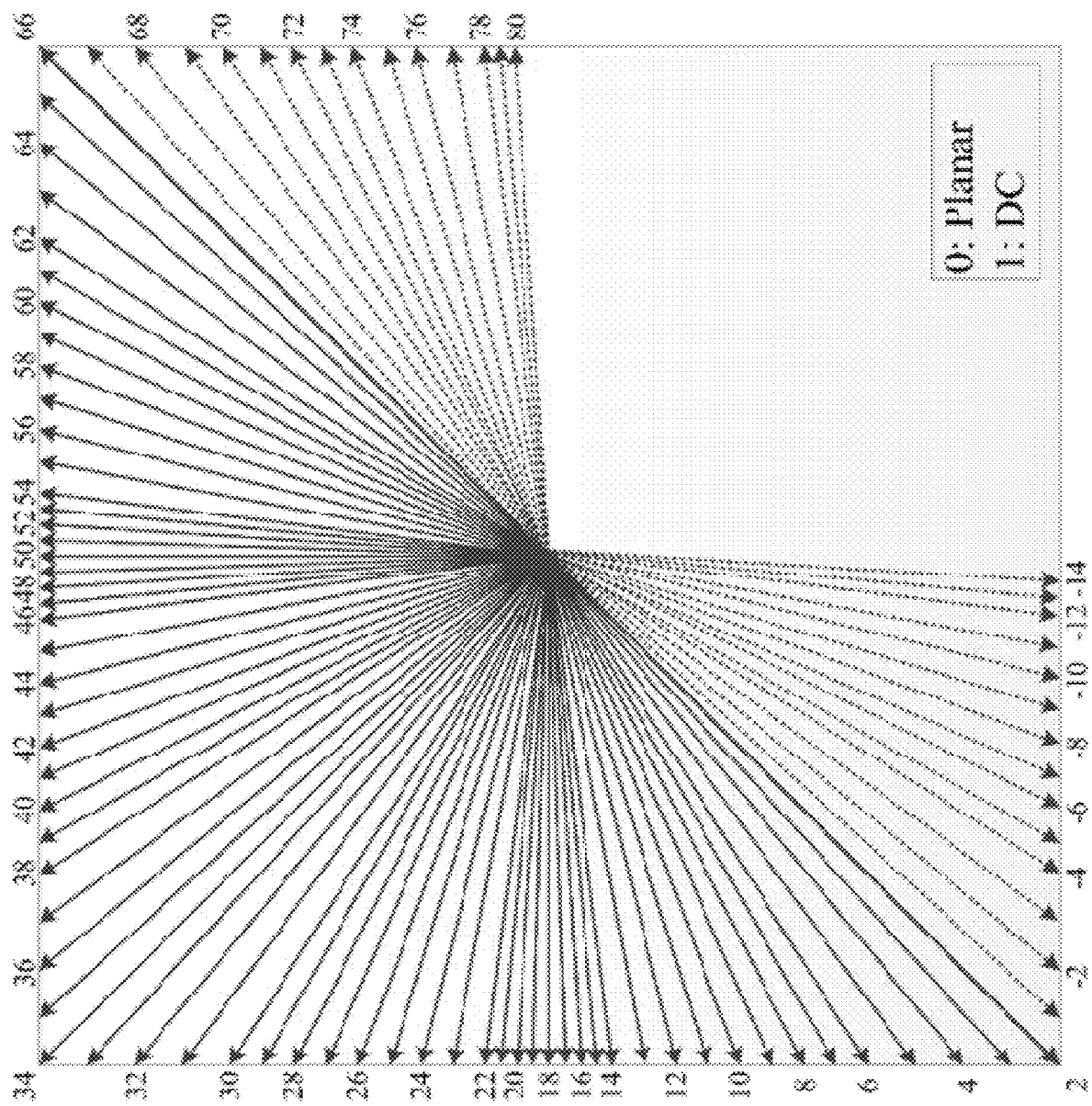
FIG. 9 is a conceptual diagram illustrating wider angles that are adopted in VTM3.

FIG. 9 is a conceptual diagram illustrating wider angles that are adopted in VTM3. Although VTM3 defines 95 modes, for any block size, only 67 modes are allowed. The exact modes that are allowed depend on the ratio of block width to block height. This is done by restricting the mode range for certain blocks sizes. FIG. 9 provides an illustration of wide angles (−1 to −14, and 67 to 80) in VTM3 beyond modes 2 and 66 for a total of 93 angular modes.

Table 2 below specifies the mapping table between predModeIntra and the angle parameter intraPredAngle in VTM3, further details of which are available from "Versatile Video Coding (Draft 3)," 12th JVET Meeting, Macau SAR, CN, October 2018, JVET-L1001 by B. Bross, J. Chen, and S. Liu.

TABLE 2

| predModeIntra | −14 | −13 | −12 | −11 | −10 | −9 | −8 | −7 | −6 | −5 |
|---|---|---|---|---|---|---|---|---|---|---|
| intraPredAngle | 512 | 341 | 256 | 171 | 128 | 102 | 86 | 73 | 64 | 57 |

TABLE 2-continued

| predModeIntra | -4 | -3 | -2 | -1 | 2 | 3 | 4 | 5 | 6 | 7 |
|---|---|---|---|---|---|---|---|---|---|---|
| intraPredAngle | 51 | 45 | 39 | 35 | 32 | 29 | 26 | 23 | 20 | 18 |
| predModeIntra | 8 | 9 | 10 | 11 | 12 | 13 | 14 | 15 | 16 | 17 |
| intraPredAngle | 16 | 14 | 12 | 10 | 8 | 6 | 4 | 3 | 2 | 1 |
| predModeIntra | 18 | 19 | 20 | 21 | 22 | 23 | 24 | 25 | 26 | 27 |
| intraPredAngle | 0 | -1 | -2 | -3 | -4 | -6 | -8 | -10 | -12 | -14 |
| predModeIntra | 28 | 29 | 30 | 31 | 32 | 33 | 34 | 35 | 36 | 37 |
| intraPredAngle | -16 | -18 | -20 | -23 | -26 | -29 | -32 | -29 | -26 | -23 |
| predModeIntra | 38 | 39 | 40 | 41 | 42 | 43 | 44 | 45 | 46 | 47 |
| intraPredAngle | -20 | -18 | -16 | -14 | -12 | -10 | -8 | -6 | -4 | -3 |
| predModeIntra | 48 | 49 | 50 | 51 | 52 | 53 | 54 | 55 | 56 | 57 |
| intraPredAngle | -2 | -1 | 0 | 1 | 2 | 3 | 4 | 6 | 8 | 10 |
| predModeIntra | 58 | 59 | 60 | 61 | 62 | 63 | 64 | 65 | 66 | 67 |
| intraPredAngle | 12 | 14 | 16 | 18 | 20 | 23 | 26 | 29 | 32 | 35 |
| predModeIntra | 68 | 69 | 70 | 71 | 72 | 73 | 74 | 75 | 76 | 77 |
| intraPredAngle | 39 | 45 | 51 | 57 | 64 | 73 | 86 | 102 | 128 | 171 |
| predModeIntra | 78 | 79 | 80 | | | | | | | |
| intraPredAngle | 256 | 341 | 512 | | | | | | | |

The inverse angle parameter invAngle is derived based on intraPredAngle as follows:

$$invAngle = \text{Round}\left(\frac{256*32}{intraPredAngle}\right) \quad (1\text{-}1)$$

Note that intraPredAngle values that are multiples of 32 (i.e. values of 0, 32, 64, 128, 256, 512 in this example) always correspond with prediction from non-fractional reference array samples, as is the case in the VTM3 specification. Table 3 below illustrates diagonal modes corresponding with various block aspect ratios.

TABLE 3

Diagonal modes corresponding with various block aspect ratios.

| Block aspect ratio (W/H) | Diagonal modes |
|---|---|
| 1 (square) | 2, 34, 66 |
| 2 | 8, 28, 72 |
| 4 | 12, 24, 76 |
| 8 | 14, 22, 78 |
| 16 | 16, 20, 80 |
| 1/2 | -6, 40, 60 |
| 1/4 | -10, 44, 56 |
| 1/8 | -12, 46, 54 |
| 1/16 | -14, 48, 52 |

MDIS and reference sample interpolation are described in the following portions of this disclosure. In HEVC, before intra prediction, the neighboring reference samples are potentially filtered using a 2-tap linear or 3-tap (1,2,1)/4 filter. This process is known as intra reference smoothing, or mode-dependent intra smoothing (MDIS). In MDIS, given the intra prediction mode index predModeIntra and block size nTbS, it is decided whether the reference smoothing process is performed and if so which smoothing filter is used. The following text is the related paragraph from the HEVC specification:

8.4.4.2.3 Filtering Process of Neighbouring Samples

Inputs to this process are:

the neighbouring samples p[x][y], with x=-1, y=-1 . . . nTbS*2-1 and x=0 . . . nTbS*2-1, y=-1, a variable nTbS specifying the transform block size.

Outputs of this process are the filtered samples pF[x][y], with x=-1, y=-1 . . . nTbS*2-1 and x=0 . . . nTbS*2-1, y=-1.

The variable filterFlag is derived as follows:

If one or more of the following conditions are true, filterFlag is set equal to 0:

predModeIntra is equal to INTRA_DC.

nTbS is equal 4.

Otherwise, the following applies:

The variable minDistVerHor is set equal to Min(Abs (predModeIntra-26), Abs(predModeIntra-10)).

The variable intraHorVerDistThres[nTbS] is specified in Table 8-3.

The variable filterFlag is derived as follows:

If minDistVerHor is greater than intraHorVerDist-Thres[nTbS], filterFlag is set equal to 1.

Otherwise, filterFlag is set equal to 0.

Table 8-3—Specification of IntraHorVerDistThres[nTbS] for Various Transform Block Sizes

TABLE 8-3

Specification of intraHorVerDistThres[nTbS] for various transform block sizes

| | nTbS = 8 | nTbS = 16 | nTbS = 32 |
|---|---|---|---|
| intraHorVerDistThres[nTbS] | 7 | 1 | 0 |

When filterFlag is equal to 1, the following applies:
The variable biIntFlag is derived as follows:
  If all of the following conditions are true, biIntFlag is set equal to 1:
    strong_intra_smoothing_enabled_flag is equal to 1
    nTbS is equal to 32
    $Abs(p[-1][-1]+p[nTbS*2-1][-1]-2*p[nTbS-1][-1])<(1<<(BitDepth_Y-5))$
    $Abs(p[-1][-1]+p[-1][nTbS*2-1]-2*p[-1][nTbS-1])<(1<<(BitDepth_Y-5))$
  Otherwise, biIntFlag is set equal to 0.
The filtering is performed as follows:
  If biIntFlag is equal to 1, the filtered sample values pF[x][y] with x=−1, y=−1 . . . 63 and x=0 . . . 63, y=−1 are derived as follows:

$pF[-1][-1]=p[-1][-1]$ (8-30)

$pF[-1][y]=((63-y)*p[-1][-1]+(y+1)*p[-1][63]+32)>>6$ for y=0 . . . 62 (8-31)

$pF[-1][63]=p[-1][63]$ (8-32)

$pF[x][-1]=((63-x)*p[-1][-1]+(x+1)*p[63][-1]+32)>>6$ for x=0 . . . 62 (8-33)

$pF[63][-1]=p[63][-1]$ (8-34)

Otherwise (biIntFlag is equal to 0), the filtered sample values pF[x][y] with x=−1, y=−1 . . . nTbS*2−1 and x=0 . . . nTbS*2−1, y=−1 are derived as follows:

$pF[-1][-1]=(p[-1][0]+2*p[-1][-1]+p[0][-1]+2)>>2$ (8-35)

$pF[-1][y]=(p[-1][y+1]+2*p[-1][y]+p[-1][y-1]+2)>>2$ for y=0 . . . nTbS*2−2 (8-36)

$pF[-1][nTbS*2-1]=p[-1][nTbS*2-1]$ (8-37)

$pF[x][-1]=(p[x-1][-1]+2*p[x][-1]+p[x+1][-1]+2)>>2$ for x=0 . . . nTbS*2−2 (8-38)

$pF[nTbS*2-1][-1]=p[nTbS*2-1][-1]$ (8-39)

During JVET activities, the Joint Exploration Test Model (JEM) version 7 (further details of which are available from "Algorithm description of Joint Exploration Test Model 7," 7th JVET Meeting, Torino, Italy, July 2017, JVET-G1001 by J. Chen, E. Alshina, G. J. Sullivan, J.-R. Ohm, and J. Boyce) was defined and the following version of the MDIS table was included for luma blocks:

TABLE 4

| sizeIndex | Threshold[sizeIndex] |
|---|---|
| 0 | 20 |
| 1 | 20 |
| 2 | 14 |

TABLE 4-continued

| sizeIndex | Threshold[sizeIndex] |
|---|---|
| 3 | 2 |
| 4 | 0 |
| 5 | 20 |
| 6 | 0 |

The block size index is defined as follows in JEM7:

sizeIndex=(log 2(BlockWidth)−2+log 2(BlockHeight)−2)/2+2−1

Whether to apply the [1 2 1]/4 smoothing filter to the intra reference samples is determined as follows:

IntraModeDiff=min(abs(IntraModeIdx−*HOR*_IDX), abs(IntraModeIdx−VER_IDX))

With HOR_IDX=18 and VER_IDX=50, because JEM7 has 65 directional intra modes (IntraModeIdx 2-66) in addition to planar (IntraModeIdx=0) and DC (IntraModeIdx=1) modes. The following condition determines whether to apply the smoothing filter:

IF IntraModeDiff>Threshold[sizeIndex] THEN
    "apply smoothing filter"

In the Joint Video Experts Team (JVET) and its VVC Test Model version 3 (VTM3) ("Versatile Video Coding (Draft 3)," 12th JVET Meeting, Macau SAR, CN, October 2018, JVET-L1001 by B. Bross, J. Chen, and S. Liu), the following MDIS table is included:

TABLE 5

| sizeIndex | Threshold[sizeIndex] |
|---|---|
| 0 | 20 |
| 1 | 20 |
| 2 | 20 |
| 3 | 14 |
| 4 | 2 |
| 5 | 0 |
| 6 | 0 |
| 7 | 0 |

The block size index is defined as follows in VTM3:

sizeIndex=(log 2(BlockWidth)+log 2(BlockHeight))/2

Whether to apply the [1 2 1]/4 smoothing filter to the non-fractional intra reference samples or switch the interpolation filters between smoothing (e.g., Gaussian interpolation) and non-smoothing (e.g., cubic interpolation) for fractional reference sample positions is determined as follows (see also Provisional U.S. Patent Application Nos. 62/731,723 filed 14 Sep. 2018, 62/727,341 filed 5 Sep. 2018, and 62/693,266 filed 2 Jul. 2018, the entire contents of each of which are incorporated herein by reference, as well as "Versatile Video Coding (Draft 3)," 12th JVET Meeting, Macau SAR, CN, October 2018, JVET-L1001 by B. Bross, J. Chen, and S. Liu): IntraModeDiff=min(abs(IntraModeIdx−HOR_IDX), abs(IntraModeIdx−VER_IDX)) with HOR_IDX=18 and VER_IDX=50 and the condition:

IF IntraModeDiff>Threshold[sizeIndex]THEN "apply smoothing"

In VTM3, for wide-angle modes with index <2 or >66, the intra smoothing condition is set equal to true. The reason is that two vertically-adjacent predicted samples may use two non-adjacent reference samples in the case of wide-angle intra prediction.

Aspects of intra-inter prediction blending are discussed in "CE10.1.1: Multi-hypothesis prediction for improving AMVP mode, skip or merge mode, and intra mode," 12th JVET Meeting, Macau SAR, CN, October 2018, JVET-L0100 by M.-S. Chiang, C.-W. Hsu, Y.-W. Huang, and S.-M. Lei. The following text, bookended by quotation marks, provides an overview of intra-inter prediction blending:

"Multi-hypothesis prediction is proposed for improving AMVP mode, skip or merge mode, and intra mode. Multi-hypothesis prediction is proposed to improve the existing prediction modes in inter pictures, including uni-prediction of advanced motion vector prediction (AMVP) mode, skip and merge mode, and intra mode. The general concept is to combine an existing prediction mode with an extra merge indexed prediction. The merge indexed prediction is performed as in merge mode, where a merge index is signaled to acquire motion information for the motion compensated prediction. The final prediction is the weighted average of the merge indexed prediction and the prediction generated by the existing prediction mode, where different weights are applied depending on the combinations.

Three inter combined prediction modes are tested to combine merge indexed prediction with uni-prediction of AMVP mode, merge mode, and intra mode, respectively. When combined with uni-prediction of AMVP mode, one motion is acquired using the original syntax elements in AMVP mode while the other is acquired using the merge index, where totally two hypotheses are used. When combined with merge mode, implicit selection of succeeding merge candidate without signaling any additional merge index is used to acquire the additional motion information, where at most two more hypotheses are used. When combined with intra mode, explicit signaling of intra mode for merge mode in inter coding unit (CU) is applied to generate the combined predictions, where one more hypothesis from intra mode is used. Different weights to generate the final prediction depending on the combinations are also tested.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_inten$_i$, w_inten$_i$), where i is from 1 to 4 and (w_intra$_1$, w_inter$_1$)=(6, 2), (w_intra$_2$, w_inter$_2$)=(5, 3), (w_intra$_3$, w_inter$_3$)=(3, 5), and (w_intra$_4$, w_inter$_4$)=(2, 6), will be applied to a corresponding region. (w_intra$_1$, w_inter$_1$) is for the region closest to the reference samples and (w_intra$_4$, w_inter$_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs."

Figure 10:
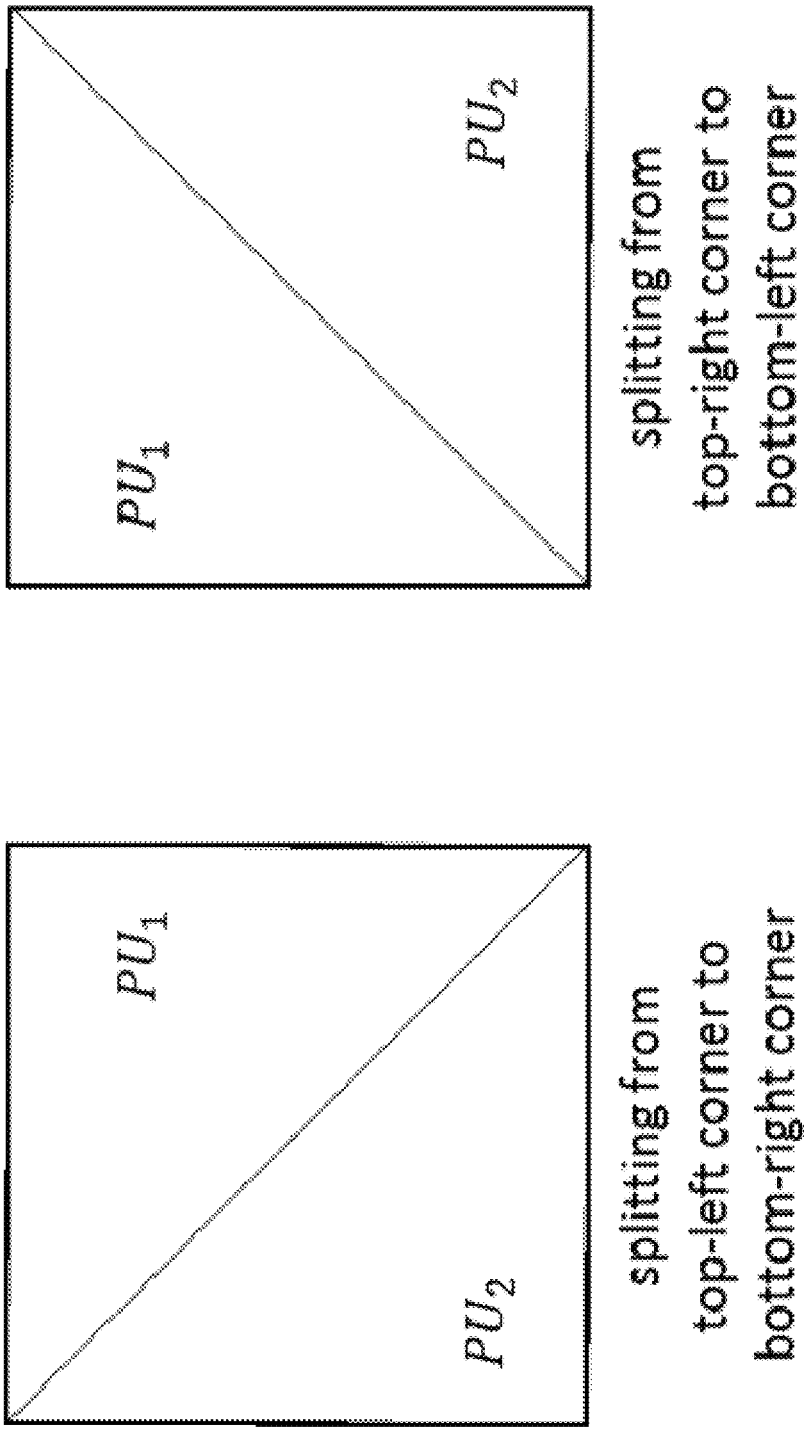
FIG. 10 is a conceptual diagram illustrating triangular motion compensated prediction.

FIG. 10 is a conceptual diagram illustrating triangular motion compensated prediction. Aspects of triangular motion compensated prediction are described in "CE10.3.1.b: Triangular prediction unit mode," 12th JVET Meeting, Macau SAR, CN, October 2018, JVET-L0124 by R.-L. Liao and C. S. Lim. The following text, bookended by quotation marks, and referring to FIG. 10, provides an overview of triangular motion compensated prediction.

"In the triangular prediction unit mode, a CU can be split using two triangular prediction units, in either diagonal or inverse diagonal direction. Each triangular prediction unit in the CU has its own uni-prediction motion vector and reference frame index which are derived from a uni-prediction candidate list. Triangular partitioning is only applied to motion compensated prediction, which means that the transform and quantization process is applied to the whole CU formed by combining the two triangles together. The triangular prediction unit mode is only applied to a CU which block size is larger than or equal to 8×8, and its coding prediction mode is either skip or merge mode. As shown in FIG. 10, it splits a CU into two triangular prediction units, in either diagonal or inverse diagonal direction."

Figure 11:
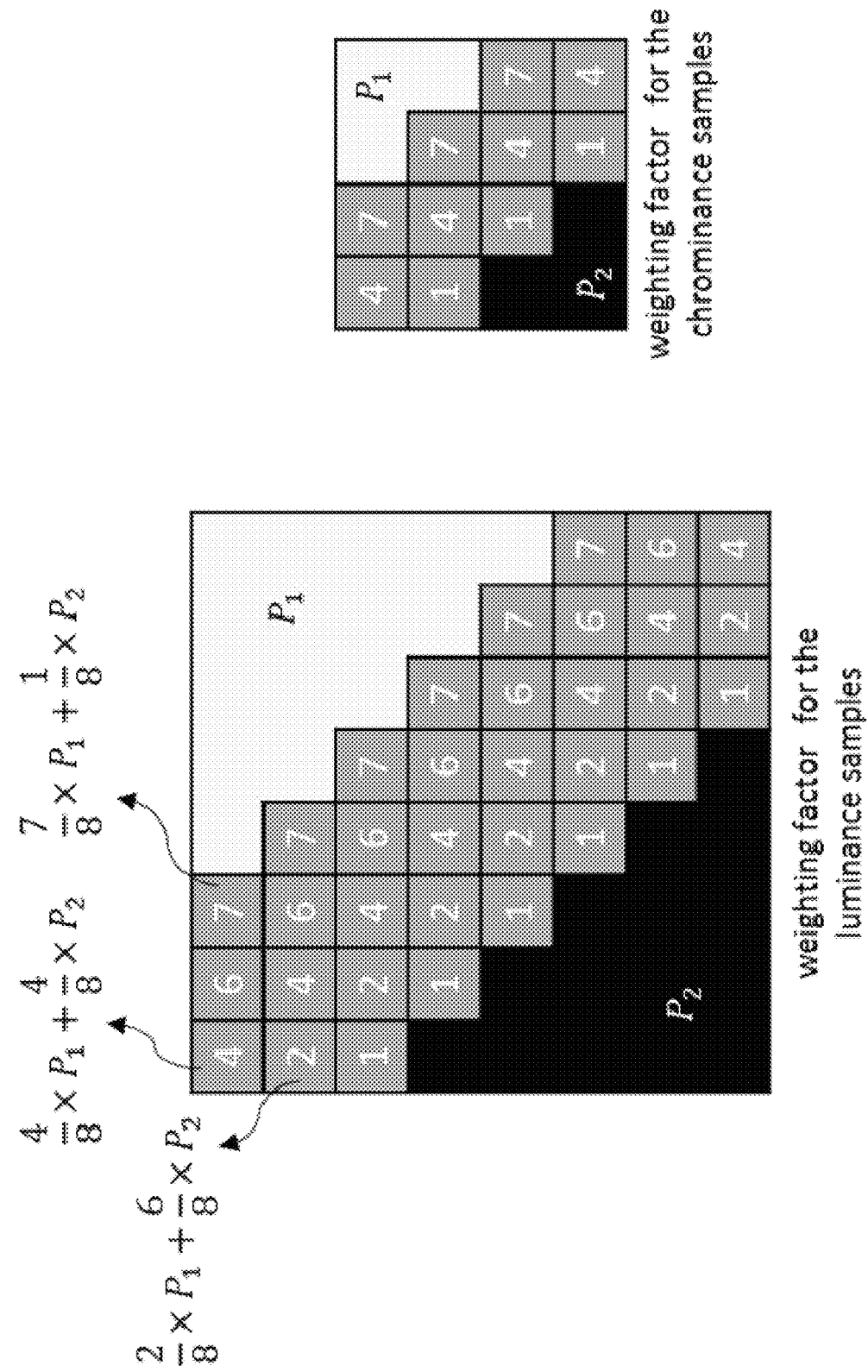
FIG. 11 is a conceptual diagram illustrating an adaptive weighting process.

FIG. 11 is a conceptual diagram illustrating an adaptive weighting process. "CE10.3.1.b: Triangular prediction unit mode," 12th JVET Meeting, Macau SAR, CN, October 2018, JVET-L0124 by R.-L. Liao and C. S. Lim also describes aspects of the adaptive weighting process. The following text, bookended by quotation marks, and referring to FIG. 11, provides an overview of the adaptive weighting process:

"After predicting each triangular prediction unit, an adaptive weighting process is applied to the diagonal edge between the two triangular prediction units to derive the final prediction for the whole CU. Two weighting factor groups are listed as follows:

1st weighting factor group: {7/8, 6/8, 4/8, 2/8, 1/8} and {7/8, 4/8, 1/8} are used for the luminance and the chrominance samples, respectively;

2nd weighting factor group: {7/8, 6/8, 5/8, 4/8, 3/8, 2/8, 1/8} and {6/8, 4/8, 2/8} are used for the luminance and the chrominance samples, respectively.

One weighting factor group is selected based on the comparison of the motion vectors of two triangular prediction units. The 2nd weighting factor group is used when the reference pictures of the two triangular prediction units are different from each other or their motion vector difference is larger than 16 pixels. Otherwise, the 1st weighting factor group is used. An example is shown in FIG. 11."

The various technologies described above present one or more potential problems/issues. For instance, let the prediction sample intraPred(x,y) located at (x, y) be predicted with an intra prediction mode (DC, planar, angular) and its value be modified using the PDPC expression for a single reference sample line to obtain the intraPredPDPC(x,y) prediction sample as follows:

$$\text{intraPredPDPC}(x,y) = (wL \times R_{-1,y} + wT \times R_{x,-1} - wTL \times R_{-1,-1} + (64 - wL - wT + wTL) \times \text{intraPred}(x,y) + 32) >> 6$$

where $R_{x,-1}$, $R_{-1,y}$ represent the reference samples located at the top and left of current sample (x, y), respectively, and $R_{-1,-1}$ represents the reference sample located at the top-left corner of the current block. Intra-inter prediction blends this prediction sample intraPredPDPC(x,y) with a merge mode prediction interPred(x,y), for example, by simple averaging as follows:

$$\text{intraInterPred}(x,y)=(\text{intraPredPDPC}(x,y)+\text{interPred}(x,y)+1)\!>\!>\!1$$

A potential problem is that PDPC is applied before the intra-inter blending step, which may adversely affect coding efficiency and implementation complexity.

Secondly, in the case of triangular motion compensated prediction, the two triangular prediction units are only applied to a motion-compensated or inter-predicted CU. Blending of one intra and one inter triangular prediction unit is not supported. There exist ambiguities as to how PDPC together with blending is applied in this case.

Thirdly, the MDIS filtering may be applied to the reference samples for intra prediction before intra-inter blending, which may adversely affect coding efficiency and implementation complexity.

This disclosure describes various techniques address one or more of the potential problems listed above. In various examples, the techniques described below may mitigate one or more of the potential problems, and in other examples, the techniques may eliminate one or more of the potential problems. The techniques of this disclosure may be implemented individually, or in some examples, various combinations of the techniques may be implemented, whether concurrently or in any serial sequence.

According to some examples in accordance with this disclosure, video encoder 200 and/or video decoder 300 may predict intra block samples by using an intra mode together with PDPC, intraPredPDPC(x,y), and the inter prediction block samples, interPred(x,y), can be blended together by one of the following example intra-inter prediction blending processes:

a. Averaging:

$$\text{intraInterPred}(x,y)=(\text{intraPredPDPC}(x,y)+\text{interPred}(x,y)+1)\!>\!>\!1$$

b. Weighting with position independent weight parameter wB, e.g., if wB value range is 0 . . . 32:

$$\text{intraInterPred}(x,y)=(wB\times\text{intraPredPDPC}(x,y)+(32-wB)\times\text{interPred}(x,y)+16)\!>\!>\!5$$

c. Weighting with position dependent weight parameter $wB_{(x,y)}$, e.g., if $wB_{(x,y)}$ value range is 0 . . . 32:

$$\text{intraInterPred}(x,y)=(wB(x,y)\times\text{intraPredPDPC}(x,y)+(32-wB(x,y))\times\text{interPred}(x,y)+16)\!>\!>\!5$$

d. Video encoder 200 and/or video decoder 300 may make the weights dependent on the intra mode, e.g., for planar, DC, directional, or wide-angle directional modes, different position independent or position dependent weights can be applied.

e. Video encoder 200 and/or video decoder 300 may make the weights dependent on the inter mode or motion data.

f. Video encoder 200 and/or video decoder 300 may make the weights dependent on the block dimensions (width, height), on the block area, block shape (square, rectangular, triangular, . . . ).

g. Video encoder 200 and/or video decoder 300 may make the weights dependent on neighboring block data, such as the intra or inter mode of neighboring blocks.

h. Video encoder 200 and/or video decoder 300 may fully or partially disable intra-inter prediction blending by applying weights so that only one of the intra or inter modes is chosen per block or per block sample. For example, in this manner prediction units within the current block can be defined with various shapes, e.g., triangular units.

i. Video encoder 200 and/or video decoder 300 may enable or disable intra-inter prediction blending based on flags or values coded in the bitstream (parameter sets, picture header, tile header, slice header, etc.) or based on conditions dependent on block dimensions, block area, block shape, prediction modes.

j. Video encoder 200 and/or video decoder 300 may use planar mode as the intra mode.

According to some examples in accordance with this disclosure, video encoder 200 and/or video decoder 300 may predict intra block samples by using an intra mode, i.e., without using PDPC, intraPred(x,y). In these examples, video encoder 200 and/or video decoder 300 may blend the inter prediction block samples, interPred(x,y), together by one of the following example intra-inter prediction blending processes:

a. Averaging:

$$\text{intraInterPred}(x,y)=(\text{intraPred}(x,y)+\text{interPred}(x,y)+1)\!>\!>\!1$$

b. Weighting with position independent weight parameter wB, e.g., if wB value range is 0 . . . 32:

$$\text{intraInterPred}(x,y)=(wB\times\text{intraPred}(x,y)+(32-wB)\times\text{interPred}(x,y)+16)\!>\!>\!5$$

c. Weighting with position dependent weight parameter wB(x,y), e.g., if wB(x,y) value range is 0 . . . 32:

$$\text{intraInterPred}(x,y)=(wB(x,y)\times\text{intraPred}(x,y)+(32-wB(x,y))\times\text{interPred}(x,y)+16)\!>\!>\!5$$

d. Video encoder 200 and/or video decoder 300 may make the weights dependent on the intra mode, e.g., for planar, DC, directional, or wide-angle directional modes, different position independent or position dependent weights can be applied.

e. Video encoder 200 and/or video decoder 300 may make the weights dependent on the inter mode or motion data.

f. Video encoder 200 and/or video decoder 300 may make the weights dependent on the block dimensions (width, height), on the block dimensions (width, height), on the block area, block shape (square, rectangular, triangular, . . . ).

g. Video encoder 200 and/or video decoder 300 may make the weights dependent on neighboring block data, such as the intra or inter mode of neighboring blocks.

h. Video encoder 200 and/or video decoder 300 may fully or partially disable intra-inter prediction blending by applying weights so that only one of the intra or inter modes is chosen per block or per block sample. For example, in this manner prediction units within the current block can be defined with various shapes, e.g., triangular units.

i. Video encoder 200 and/or video decoder 300 may enable or disable intra-inter prediction blending based on flags or values coded in the bitstream (parameter sets, picture header, tile header, slice header, etc.) or based on conditions dependent on block dimensions, block area, block shape, prediction modes.

j. Video encoder 200 and/or video decoder 300 may use planar mode as the intra mode.

According to some examples in accordance with this disclosure, video encoder 200 and/or video decoder 300 may predict intra block samples by using an intra mode, i.e., without using PDPC or with PDPC, intraPred(x,y). In these examples, video encoder 200 and/or video decoder 300 may blend the inter prediction block samples, interPred(x,y), and neighboring reconstructed reference samples from one or multiple lines on the left or top of the current block together by one of the following example intra-inter prediction blending processes:

a. Averaging intraPred(x,y) and interPred(x,y), and blending this average together with neighbouring reconstructed reference samples by applying weights:

$$\text{intraInterPred}(x,y)=(wL \times R_{-1,y}+wT \times R_{x,-1}-wTL \times R_{-1,-1}+(64-wL-wT+wTL) \times ((\text{intrapred}(x,y)+\text{interpred}(x,y)+1)>>1)+32)>>6$$

or with a single rounding operation as follows:

$$\text{intraInterPred}(x,y)=(2 \times wL \times R_{-1,y}+2 \times wT \times R_{x,-1}-2 \times wTL \times R_{-1,-1}+(64-wL-wT+wTL) \times (\text{intrapred}(x,y)+\text{interpred}(x,y))+64)>>7$$

where $R_{x,-1}$, $R_{-1,y}$ represent the reference samples located at the top and left of current sample (x, y), respectively, and $R_{-1,-1}$ represents the reference sample located at the top-left corner of the current block.

i. Weights wL, wT, wTL can be position independent.
  ii. Weights wL, wT, wTL can be position dependent and can be computed or stored in a table or template.
  iii. Weights wL, wT, wTL can be position independent, and depend on the intra mode, or on the inter mode (or motion data), or on both modes, of the prediction blocks in the blending process or neighboring blocks.
  iv. Weights wL, wT, wTL can be position dependent and depend on the intra mode, e.g., PDPC weights can be applied corresponding with the intra mode, e.g., DC mode weights:

$$wT=32>>((y<<1)>>\text{shift}), wL=32>>((x<<1)>>\text{shift}), wTL=(wL>>4)+(wT>>4),$$

with $\text{shift}=(\log_2(\text{width})+\log_2(\text{height})+2)>>2$ v. Weights wL, wT, wTL can be position dependent and depend on the intra mode, e.g., PDPC weights can be applied corresponding with the intra mode, e.g., planar mode weights:

$$wT=32>>((y<<1)>>\text{shift}), wL=32>>((x<<1)>>\text{shift}), wTL=0,$$

with $\text{shift}=(\log_2(\text{width})+\log_2(\text{height})+2)>>2$ vi. Weights wL, wT, wTL can be position dependent and depend on the inter mode or motion data, e.g., motion vector direction.

b. Weighting intraPred(x,y) and interPred(x,y) with position independent weight wB, and blending this weighted average together with neighbouring reconstructed reference samples by applying weights:

$$\text{intraInterPred}(x,y)=(wL \times R_{-1,y}+wT \times R_{x,-1}-wTL \times R_{-1,-1}+(64-wL-wT+wTL) \times ((wB \times \text{intrapred}(x,y)+(32-wB) \times \text{interpred}(x,y)+16)>>5)+32)>>6$$

or with a single rounding operation as follows:

$$\text{intraInterPred}(x,y)=(32 \times wL \times R_{-1,y}+32 \times wT \times R_{x,-1}-32 \times wTL \times R_{-1,-1}+(64-wL-wT+wTL) \times (wB \times \text{intrapred}(x,y)+(32-wB) \times \text{interpred}(x,y))+(1<<10))>>11$$

c. Weighting intraPred(x,y) and interPred(x,y) with position dependent weight wB(x,y), and blending this weighted average together with neighbouring reconstructed reference samples by applying weights:

$$\text{intraInterPred}(x,y)=(wL \times R_{-1,y}+wT \times R_{x,-1}-wTL \times R_{-1,-1}+(64-wL-wT+wTL) \times ((wB(x,y) \times \text{intrapred}(x,y)+(32-wB(x,y)) \times \text{interPred}(x,y)+16)>>5)+32)>>6$$

or with a single rounding operation as follows:

$$\text{intraInterPred}(x,y)=(32 \times wL \times R_{-1,y}+32 \times wT \times R_{x,-1}-32 \times wTL \times R_{-1,-1}+(64-wL-wT+wTL) \times (wB(x,y) \times \text{intrapred}(x,y)+(32-wB(x,y)) \times \text{interPred}(x,y))+(1<<10))>>11$$

i) In one example, where intraPred(x,y) is equal to the planar prediction mode, the position dependent weighting utilizes PDPC-style weights as follows:

$$wB(x,y)=32+(32>>((x<<1)>>\text{shift}))+(32>>((y<<1)>>\text{shift})),$$

$$\text{intraInterPred}(x,y)=(128 \times wL \times R_{-1,y}+128 \times wT \times R_{x,-1}+(64-wL-wT) \times (wB(x,y) \times \text{intrapred}(x,y)+(128-wB(x,y)) \times \text{interPred}(x,y))+(1<<12))>>13$$

with $wT=32>>((y<<1)>>\text{shift}), wL=32>>((x<<1)>>\text{shift}), wTL=0,$ $\text{shift}=(\log_2(\text{width})+\log_2(\text{height})+2)>>2$ or $$wT=16>>((y<<1)>>\text{shift}), wL=16>>((x<<1)>>\text{shift}), wTL=0,$$

$$\text{intraInterPred}(x,y)=(128 \times wL \times R_{-1,y}+128 \times wT \times R_{x,-1}+(32-wL-wT) \times (wB(x,y) \times \text{intrapred}(x,y)+(128-wB(x,y)) \times \text{interPred}(x,y))+(1<<11))>>12$$

ii) In one example, the weights for neighboring samples, intra prediction samples and inter prediction samples are position dependent. An example of this implementation can be as follows:

$$wT=16>>((y<<1)>>\text{shift}), wL=16>>((x<<1)>>\text{shift})$$

$$w=wT+wL$$

$$w\text{Intra}=32+w$$

$$w\text{Inter}=96-w$$

$$\text{intraInterPred}(x,y)=(128 \times wL \times R_{-1,y}+128 \times wT \times R_{x,-1}+(32-wL-wT) \times (w\text{Intra} \times \text{intrapred}(x,y)+w\text{Inter} \times \text{interPred}(x,y))+(1<<11))>>12$$

Figure 12:
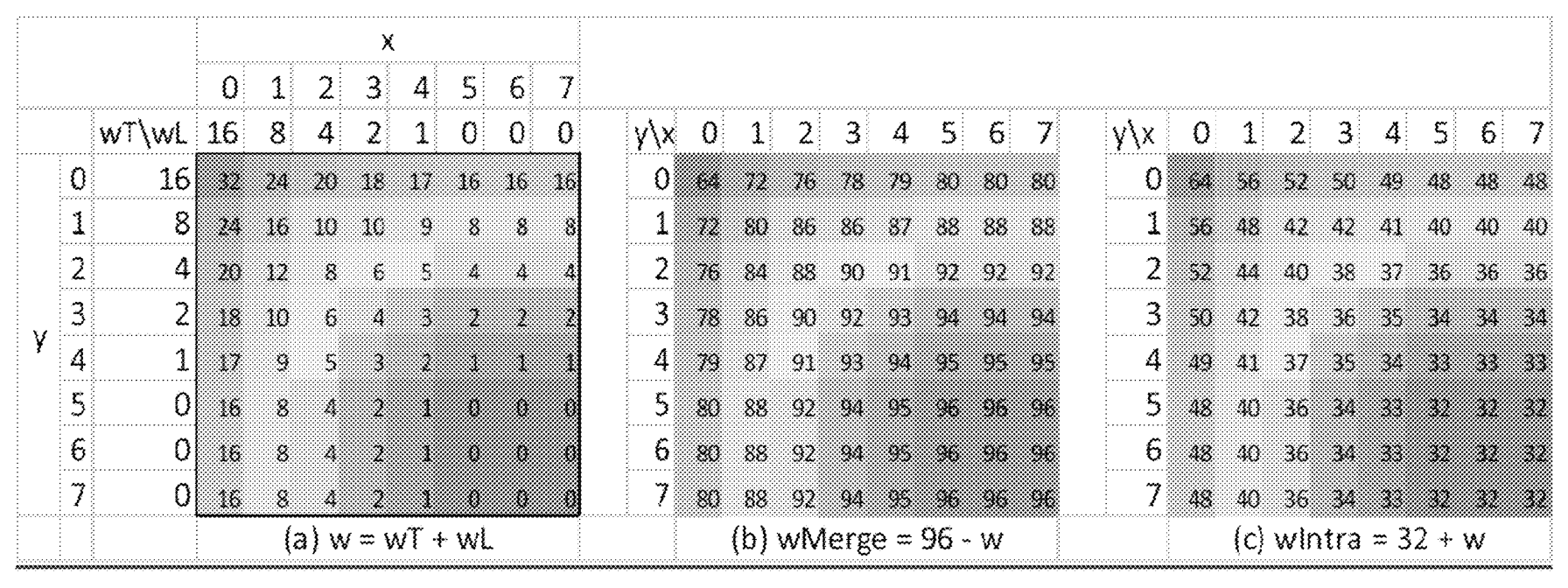

FIG. 12 is a conceptual diagram representing an example of position dependent weights for an 8×8 block.

iii) In another example, $$wB(x,y)=64+\text{MAX}((32>>((x<<1)>>\text{shift})),(32>>((y<<1)>>\text{shift})))$$

or $$wB(x,y)=64+\text{MIN}((32>>((x<<1)>>\text{shift})),(32>>((y<<1)>>\text{shift})))$$

with MIN(a, b), MAX(a, b) being the minimum and maximum, respectively, of values a and b.

iv) To reduce the rounding operations further, planar mode PL(x, y) may be further deconstructed into two parts, a horizontal interpolated part H(x, y) and a vertical interpolated part V(x,y), for example as follows: PL(x, y)=(H(x,y)+V(x,y)+1)/2, and the blending operation may be defined as follows: intraInterPred(x, y)=(64×wL×$R_{-1,y}$+64×wT×$R_{x,-1}$−64×wTL×$R_{-1,-1}$+(128−wL−wT+wTL)×(wB(x,y)×(H(x,y)+V(x,y))+(32−wB(x,y))×interPred(x,y))+(1<<11))>>12 a. Weights can be dependent on the intra mode, e.g., for planar, DC, directional, or wide-angle directional modes, different position independent or position dependent weights can be applied.
b. Weights can be dependent on the inter mode or motion data.
c. Weights can be dependent on the block dimensions (width, height), on the block area, block shape (square, rectangular, triangular, . . . ).
d. Weights may be dependent on neighboring block data, such as the intra or inter mode of neighboring blocks. That is, video encoder 200 and/or video decoder 300 may determine the weights in such a way that the weight calculations depend on neighboring block data, such as the intra or inter mode of neighboring blocks.
e. Intra-inter prediction blending can be fully or partially disabled by applying weights so that only one of the intra or inter modes is chosen per block or per block sample. For example, in this manner prediction units within the current block can be defined with various shapes, e.g., triangular units.
f. Intra-inter prediction blending can be disabled based on flags or values coded in the bitstream (parameter sets, picture header, tile header, slice header, etc.) or based on conditions dependent on block dimensions, block area, block shape, prediction modes.
g. Neighbouring reconstructed reference samples can be filtered with a smoothing filter, bilateral filter, etc. MDIS conditions that are dependent on the intra mode and block size can be applied to determine whether to use unfiltered or filtered reference samples, or conditions can apply based on the inter mode, motion data, intra mode, block dimensions, block area, block shape, etc. This information can be obtained from neighbouring, current, or co-located blocks.
h. The intra mode may be planar mode. That is, video encoder 200 and/or video decoder 300 may use planar mode as the intra mode.

According to some examples of this disclosure, video encoder 200 and/or video decoder 300 may determine the intra mode from all intra modes or from a select set of intra modes (e.g., planar, DC, horizontal, vertical), or only a single intra mode can be allowed (e.g., planar). The allowed intra modes can depend on the modes of neighboring blocks.

According to some examples of this disclosure, video encoder 200 and/or video decoder 300 may determine the inter mode from all inter modes or from a select set of inter modes (e.g., skip, merge), or only a single inter mode can be allowed (e.g., merge). The allowed inter modes can depend on the modes of neighboring or co-located blocks.

According to some examples of this disclosure, intra-inter blending may use more than two predictions, e.g., two inter predictions and one intra prediction. According to some of these examples, neighboring reconstructed reference samples from one or multiple lines on the left or top of the current block can be used.

According to some examples of this disclosure, when triangular prediction blocks are used to code a block, a PDPC-like combination may be applied to one or more triangular prediction blocks. A PDPC-like combination may involve combining a temporary predicted sample value (obtained by a prediction method), with one or more neighboring reference samples. In some instances, the combination may use different weights for each term in the combination. In some such instances, the weights may depend on the position of the current sample with respect to the current triangular block or the current block. Various implementations of these examples are listed below:

a. In some examples, the reference samples may also refer to samples that belong to a triangular prediction block of the current block.
b. In one example, wL, wT, wTL, and wR weights are defined for left, top, top-left and right reference samples, respectively. A PDPC-like combination for a sample s(x,y) at position (x,y) may be defined as follows:

$$\text{pred}(x,y) = (wL \times R_{x1(x),y1(x)} + wT \times R_{x2(x),y2(x)} + wR \times R_{x3(x),y3(x)} - wTL \times R_{-1,-1} + (64 - wL - wT - wR + wTL) \times s(x,y) + 32) \gg 6$$

where (xN(x),yN(x)) specify sample locations of left, top and right reference samples, respectively, used of for the PDPC-like combination for sample s(x,y).

Figure 13B:
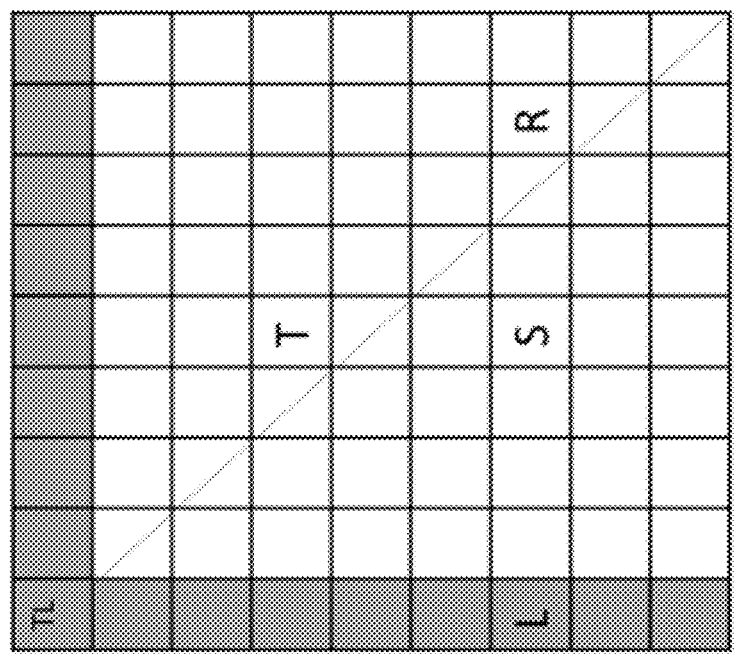
FIGS. 13A and 13B are conceptual diagrams illustrating examples of a combination for two samples.
Figure 13A:
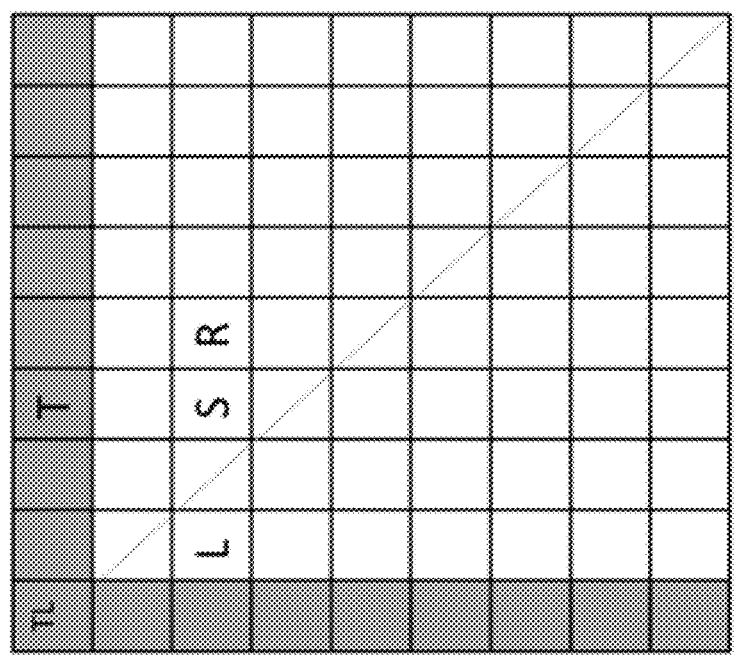

FIGS. 13A and 13B are conceptual diagrams illustrating examples of a combination for two samples. In FIGS. 13A and 13B, an example 8×8 block is split into two triangular partition blocks. The weights may be defined to be similar to the weights defined for PDPC based on the distance from the sample s(x,y) and shift operations. The weights may also depend on the mode that is used for prediction.

FIG. 13A shows how the PDPC-like combination is applied to sample S using reference samples T, L, R and TL. For different positions of the sample S, the reference samples change. S is the current sample, and L, R, T and TL are the left, right, top and top-left reference samples of S, respectively. In one example, the weights are defined such that the weights are non-zero only for some samples within a certain distance (e.g., two or three sample values) of the diagonal line creating the two triangular partitions. In another example, the location of one or more reference samples may be a function of the row index corresponding to the sample; in another example, the location of one or more reference samples may be a function of the column index corresponding to the sample.

Figure 14B:
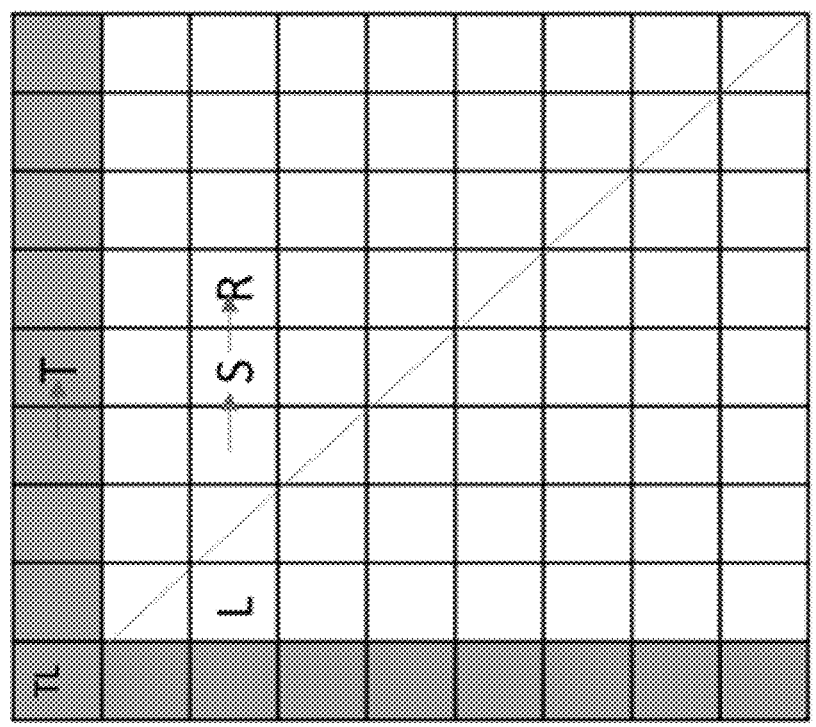
FIGS. 14A-14D are conceptual diagrams illustrating how left reference samples may vary for certain neighborhoods of samples.
Figure 14A:
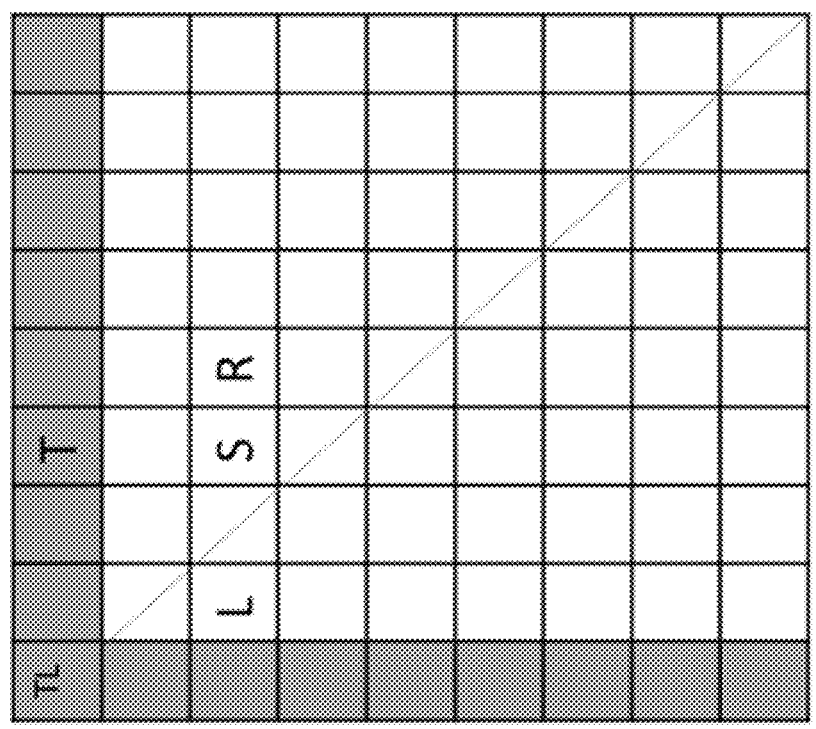
Figure 14D:
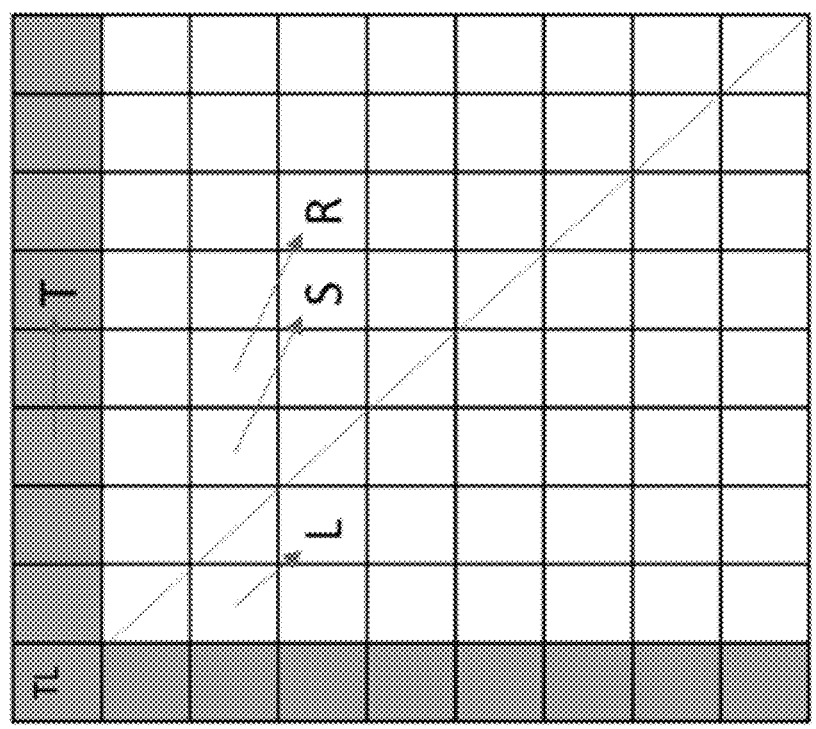
Figure 14C:
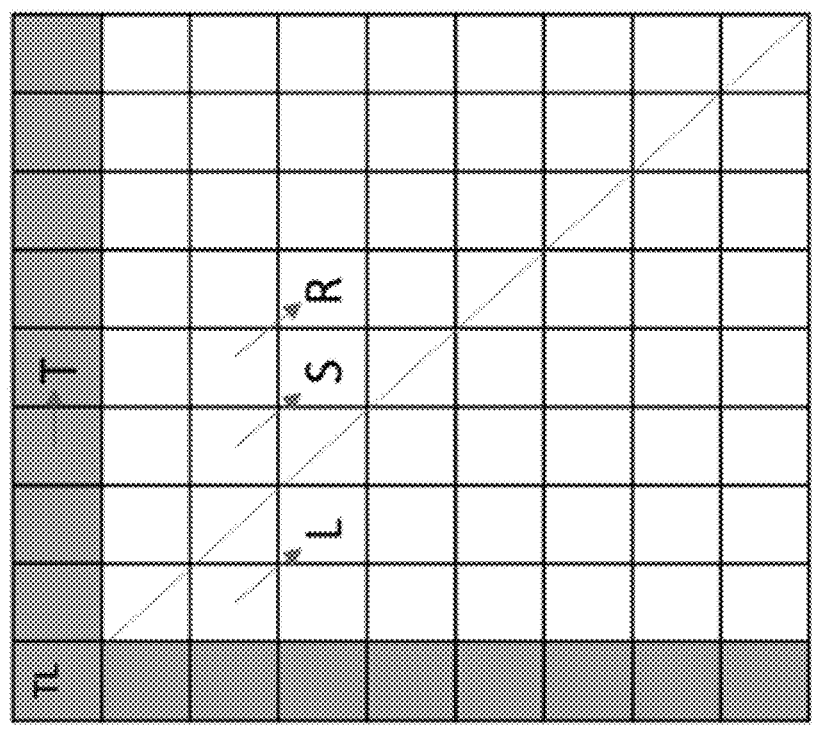

FIGS. 14A-14D are conceptual diagrams illustrating how left reference samples may vary for certain neighborhoods of samples. In particular, FIGS. 14A-14D illustrate examples of how reference samples may change with the position of sample S. FIG. 14B-14D illustrate examples in which arrows represent how the samples and the reference samples have moved with respect to the samples. Arrows in FIGS. 14B-14D indicate the shift in the samples with respect to FIG. 14A. In FIGS. 14A-14D, S is the current sample, and L, R, T and TL are the left, right, top and top-left reference samples of S, respectively. In FIGS. 14B, T, S, and R are shifted to the right. In FIG. 14C, T is shifted to the right and L, S, and R are shifted to the bottom and to the right. In FIG. 14D, T is shifted two to the right, L is shifted to the bottom and to the right, and S and R are shifted to the bottom and two to the right.

In some examples, PDPC-like combination may not apply to a partition block of the current block, e.g., a first triangular block in the current block. In other examples, weights associated with one or more of the reference samples may be set equal to 0 for a partition block, e.g., a first partition block. In FIG. 12, middle block (b), when the left triangular partition block is reconstructed first, the weight associated with the right reference sample may be set equal to 0.

c) In one example, PDPC-like combination may be applied to an intra-coded block, an inter-coded block, or an intra-inter prediction blended block. In other examples, a PDPC-like combination may be applied to intra-coded or inter-coded blocks; one or more such combined blocks may then be blended using another combination, e.g., using PDPC.

d) In one example, the application of PDPC to one or more triangular prediction blocks may be controlled by an indicator that video encoder 200 signals to video decoder 300 in the bitstream (e.g., a flag specifying that PDPC is applied to a triangular prediction block) or inferred/derived by a coder (e.g., by video decoder 300) depending on the block size, mode used for prediction, or other characteristics of the current or neighboring blocks.

Figure 15B:
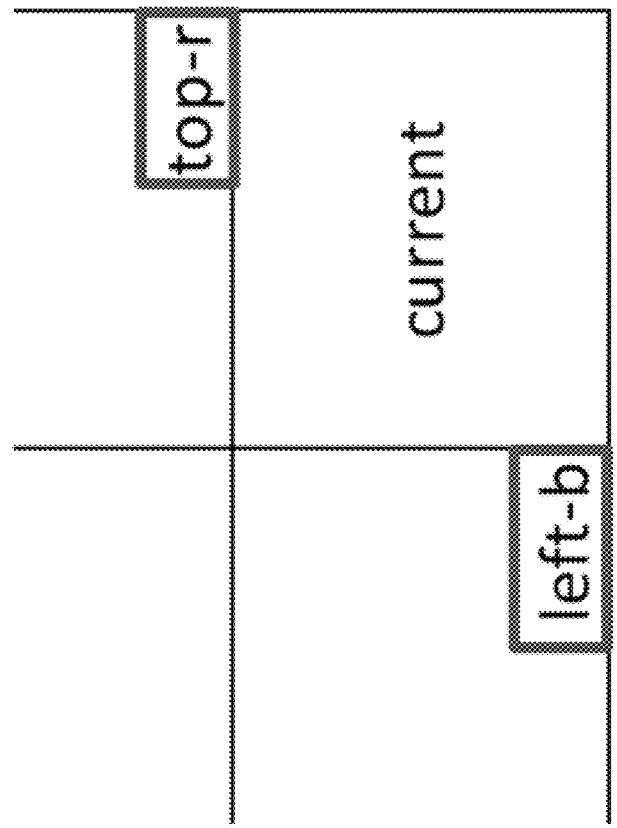
FIGS. 15A and 15B are conceptual diagrams illustrating examples of weight calculations according to aspects of this disclosure.
Figure 15A:
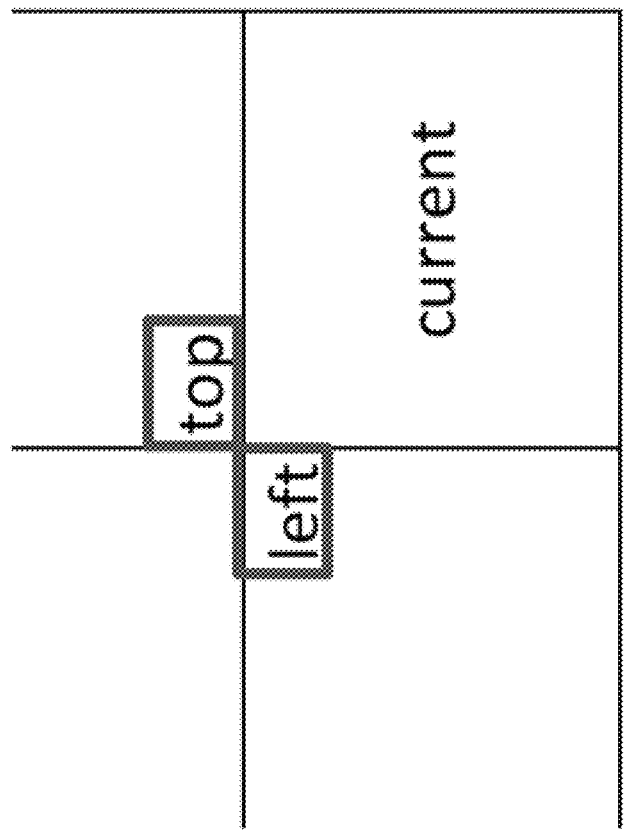

FIGS. 15A and 15B are conceptual diagrams illustrating examples of weight calculations according to aspects of this disclosure. According to some examples of this disclosure, video encoder 200 and video decoder 300 may predict the intra block samples using an intra mode, e.g., without using PDPC or with PDPC, intraPred(x,y), and the inter prediction block samples, interPred(x,y), may be blended together using position-independent weights for intra and inter prediction samples. For instance, video encoder 200 and/or video decoder 300 may blend the intra block samples predicted using an intra mode together using position-independent weights for intra and inter prediction samples. Let wIntra and wInter be the weights of intraPred(x,y) and interPred(x,y), respectively. wIntra and wInter may be defined as follows:

a. wIntra and wInter are decided using the number of intra-coded neighbors of the current block. For example, the decision of the weights may rely on the prediction mode of the top and left blocks as shown in FIG. 15A. That is, video encoder 200 and video decoder 300 may determine the weights according to a block above the current block that touches an upper-left corner of the current block ("top") and a block to the left of the current block that touches the upper-left corner of the current bock ("left") as shown in FIG. 15A. In another example, video encoder 200 and video decoder 300 may determine the weights using reference blocks of a top-right (top-r) and left-bottom (left-b) as depicted in FIG. 15B. That is, video encoder 200 and video decoder 300 may determine the weights according to a block above the current block that touches an upper-right corner of the current block ("top-r") and a block to the left of the current block that touches a lower-left corner of the current bock ("left-b") as shown in FIG. 15B. In some examples, if both of the reference blocks are intra-coded, video encoder 200 and video decoder 300 determine a value for wIntra that is higher than wInter. If only one of the reference blocks is intra-coded, video encoder 200 and video decoder 300 may determine equal values for wIntra and wInter. Otherwise, if both of the reference blocks are inter-predicted, video encoder 200 and video decoder 300 may determine a value for wIntra that is smaller than wInter. In one example, if both reference blocks are intra-coded, video encoder 200 and video decoder 300 set (wIntra, wInter) equal to (3, 1); if one of these reference blocks is intra-coded and the other is inter-coded, video encoder 200 and video decoder 300 may set these weights equal to (2, 2); otherwise if both reference blocks are inter-coded, video encoder 200 and video decoder 300 may set the weights equal to (1, 3).

b. In some examples, video encoder 200 and video decoder 300 may calculate wIntra and wInter using the size of the current block.

In one example, wIntra and wInter are given as follows:

$$wInter=\min(\log 2(width), \log 2(height)).$$

$$wIntra=\log 2(MAX\_BLOCK\_SIZE)-wInter$$

where MAX_BLOCK_SIZE is the maximum size allowed for a block.

In another example, wIntra and wInter are given as follows:

$$wInter=(\min(1 \log 2(width), \log 2(height)) >> 1) << 1.$$

$$wIntra=\log 2(MAX\_BLOCK\_SIZE)-wInter$$

In another example, the weights are calculated as:

$$wInter=\log 2(width+height)-1.$$

$$wIntra=\log 2(MAX\_BLOCK\_SIZE)-wInter$$

With the position-independent weights, video encoder 200 and/or video decoder 300 may perform the blending process according to the following equation:

$$pred(x,y)=(wIntra*intraPred(x,y)+wInter*interPred(x,y)+offset)/(wIntra+wInter)$$

To avoid division in the blending process, (wIntra+wInter) may be designed to be a power of 2, i.e., (wIntra+wInter)=$2^N$.

In this design, the blending equation becomes:

$$pred(x,y)=(wIntra*intraPred(x,y)+wInter*interPred(x,y)+(1<<(N-1)))>>N$$

In one example, a look-up table (LUT)-based division may be used to perform the division.

In another example, video encoder 200 and/or video decoder 300 may avoid performing explicit clipping when deriving pred(x,y) and the clipping operation may be combined with the clipping operation of PDPC as described above.

According to some examples of this disclosure, the blending may use the intra predicted samples, inter predicted samples and neighboring reconstructed reference samples from one or multiple lines neighboring (e.g., on the left or top of) the current block.

a. In one example, the weights for intra and inter predicted samples are position-independent (as described above with respect to examples in which the intra block samples are predicted by using an intra mode, e.g., without using PDPC or with PDPC intraPred(x,y) and the inter prediction block samples interPred(x,y) may be blended together using position-independent weights for intra and inter prediction samples), while the weight for neighboring reconstructed samples may be decided using a position-dependent scheme (as described above with respect to examples in which intra block samples predicted by using an intra mode, i.e., without using PDPC or with PDPC, intraPred(x,y), and the inter prediction block samples, interPred(x,y), and neighboring reconstructed reference samples from one or multiple lines on the left or top of the current block, can be blended together). In one example, the blended sample is given as:

$$pred(x,y)=((wL*L<<2)+(wT*T<<2)+(32-wL-wT)*(wIntra*intraPred(x,y)+wInter*interPred(x,y))+(1<<6))>>7;$$

with $wT=16>>((y<<1)>>shift), wL=16>>((x<<1)>>shift)$ $$shift=(\log_2(width)+\log_2(height)+2)>>2$$

b. In another example, the blended sample is given as:

$$\text{pred}(x,y)=((wL*L<<2)+(wT*T<<2)+(64-wL-wT)*$$
$$(w\text{Intra}*\text{intraPred}(x,y)+w\text{Inter}*\text{interPred}(x,y))+$$
$$(1<<7))>>8;$$

with $wT=32>>((y<<1)>>\text{shift}), wL=32>>((x<<1)>>\text{shift})$ $\text{shift}=(\log_2(\text{width})+\log_2(\text{height})+2)>>2$ c. In another example, the weights for the top and left samples as well as the weights for inter and intra prediction are position-independent. The predicted sample may be given as:

$$\text{pred}(x,y)=(wL*L+wT*T+W*(w\text{Intra}*\text{intraPred}(x,y)+$$
$$w\text{Inter}*\text{interPred}(x,y))+(1<<(N-1)))>>N$$

where wL, wT, W, wIntra, wInter are constant and position independent.
One example of blending can be given as:

$$\text{pred}(x,y)=(4*L+4*T+6*(w\text{Intra}*\text{intraPred}(x,y)+$$
$$w\text{Inter}*\text{interPred}(x,y))+16)>>6$$

where wInter and wIntra are decided/determined as described above with respect to examples in which the intra block samples are predicted by using an intra mode, e.g., without using PDPC or with PDPC intraPred(x,y) and the inter prediction block samples interPred(x,y) may be blended together using position-independent weights for intra and inter prediction samples.

According to some examples of this disclosure, the weights used for inter and intra prediction samples, wInter and wIntra, may be determined as follows:

a. Video encoder 200 and/or video decoder 300 may determine a first subset of the neighboring blocks, e.g., a top and left neighboring block.
b. Video encoder 200 and/or video decoder 300 may determine a second subset of the neighboring blocks, e.g., a top and left neighboring block; the first and second subset may or may not have common blocks.
c. Video encoder 200 and/or video decoder 300 may determine a first number of neighboring blocks in the first subset that satisfy a first criterion (e.g., the first criterion being a determination that the block is coded using intra mode).
d. Video encoder 200 and/or video decoder 300 may determine a second number of neighboring blocks in the second subset that satisfy a second criterion (e.g., the second criterion being a determination that the block is coded using inter-intra blended mode).
e. Video encoder 200 and/or video decoder 300 may determine weights wInter and w Infra based on the first number and the second number of blocks.
f. Video encoder 200 and/or video decoder 300 may determine to code the current block using inter-intra blending depending on the second number of neighboring blocks.
  i. In one example, an indication that the current block is coded using inter-intra blending (or other parameters related to inter-intra blending) may depend on the value of the second number; in some examples, video encoder 200 may make the signaling of the indication (or related parameters) dependeng on the value of the second number. When video encoder 200 does not signal the indication (or related parameters), a default value may be chosen. For instance, when the second number has a value 0, video encoder 200 may not signal the indication, and video decoder 300 may infer the value to be 0 (indicating that inter-intra blending is not applied to the current block).
  ii. In another example, video encoder 200 may determine the one or more contexts used for signaling indications of inter-intra blending, or its parameters, based on the value of the second number.
g. In one example, video encoder 200 and/or video decoder 300 may replace one or more determinations based on the first number (n1) or the second number (n2), or both the first and second number, with a function of the first number and the second number; e.g., the function may be n1+n2.

According to some examples of this disclosure, multiple intra-inter blending scheme(s) may be allowed. For example, a subset of the various blending schemes described above may be defined. Video encoder 200 may select the blending scheme that has/yields the best performance to encode the block. The selection of the best candidate may be performed by different approaches. Some solutions to select the best candidate, in accordance with the techniques of this disclosure, are given as follows:

a. The best blending mode is obtained by the rate-distortion optimization process. In this solution, all the candidates in the pre-defined blending set are evaluated in terms of the rate-distortion (RD) cost. The mode having the minimum cost is selected and the index of the mode is signalled to the decoder. Video encoder 200 may encode the index using a CABAC engine.
b. Video encoder 200 and/or video decoder 300 may base the selection of the blending scheme on the coding information of the block, or neighboring blocks such as motion information, coding mode, or the reference picture index of the inter prediction. In this solution, video encoder 200 may not need to signal the best blending mode. The derivation of the blending mode at video encoder 200 and video decoder 300 are identical according to this implementation. In one example, video encoder 200 and/or video decoder 300 may select the best blending scheme (e.g., in terms of RD cost) as the blending scheme to be used at video encoder 200 and/or video decoder 300.

Figure 16:
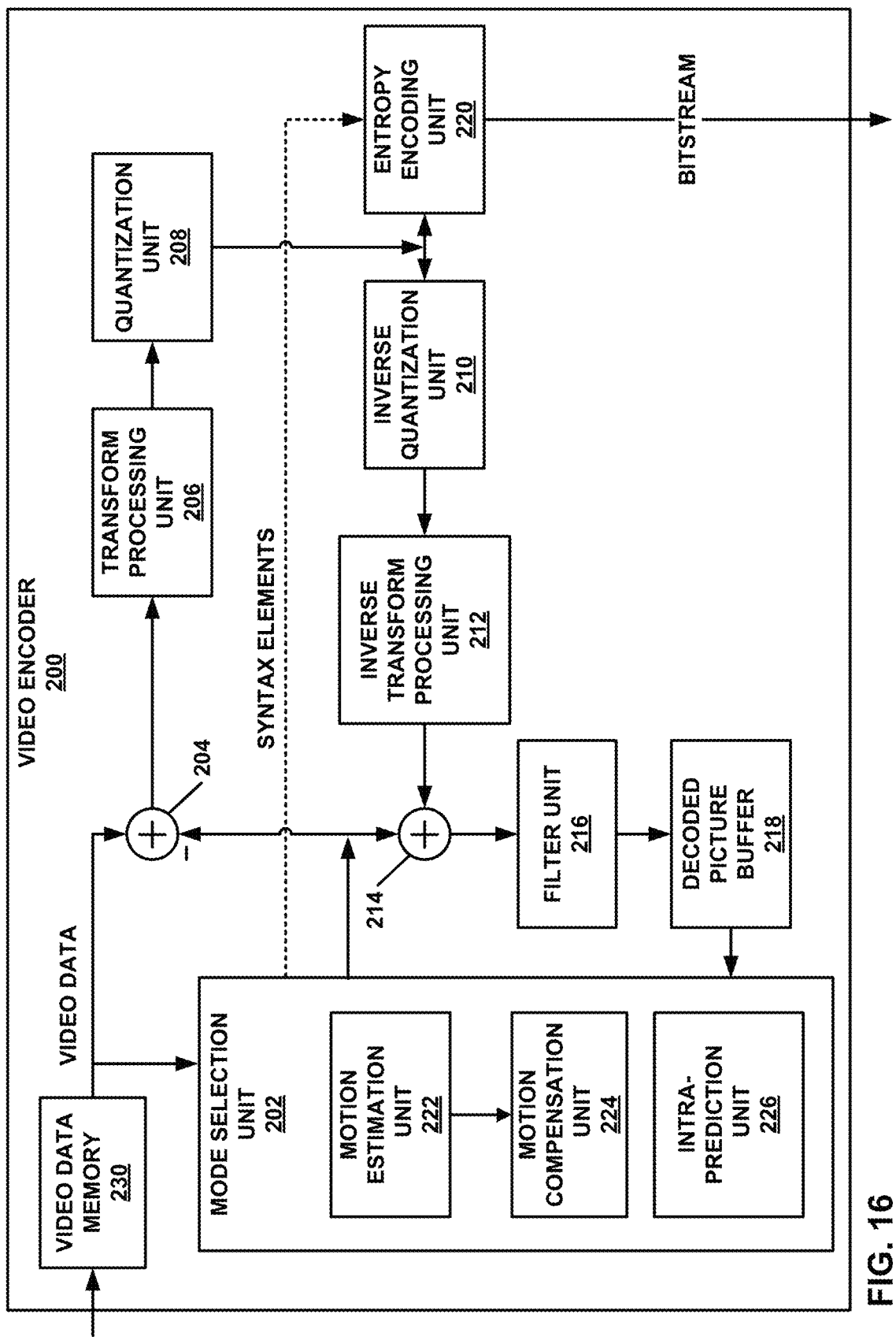
FIG. 16 is a block diagram illustrating an example video encoder that may implement one or more techniques described in this disclosure.

FIG. 16 is a block diagram illustrating an example video encoder 200 that may perform the techniques of this disclosure. FIG. 16 is provided for purposes of explanation and should not be considered limiting of the techniques as broadly exemplified and described in this disclosure. For purposes of explanation, this disclosure describes video encoder 200 in the context of video coding standards such as the HEVC video coding standard, the H.266 video coding standard in development, and VVC. However, the techniques of this disclosure are not limited to these video coding standards and are applicable generally to video encoding and decoding.

In the example of FIG. 16, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions. Non-limiting examples of processing circuitry that video encoder 200 may include are fixed function circuitry, programmable circuitry, and ASICs.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 16 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

In accordance with techniques of this disclosure, mode selection unit 202 may further cause intra-prediction unit 226, motion estimation unit 222, and motion compensation unit 224 to perform PDPC according to the techniques of this disclosure to generate a prediction block. In particular, mode selection unit 202 may select PDPC for a block of video data, e.g., based on rate-distortion optimization (RDO) performance of PDPC for the block. In general, intra-prediction unit 226 may generate an intra-prediction block for the block and motion estimation unit 222 and motion compensation unit 224 may generate an inter-prediction block for the block. Mode selection unit 202 may then determine prediction modes for neighboring blocks to the current block, e.g., the neighboring blocks of FIG. 15A or 15B.

Mode selection unit 202 may then determine weights to be applied to the intra-prediction block and the inter-prediction block according to the prediction modes for the neighboring blocks. In one example, if both the above-neighboring block and the left-neighboring block are intra-predicted, mode selection unit 202 may determine a weight of 3 to be applied to the intra-prediction block and a weight of 1 to be applied to the inter-prediction block; if both the above-neighboring block and the left-neighboring block are inter-predicted, mode selection unit 202 may determine a weight of 3 to be applied to the inter-prediction block and a weight of 1 to be applied to the intra-prediction block; and if one of the above-neighboring block and the left-neighboring block is intra-predicted and the other is inter-predicted, mode selection unit 202 may determine a weight of 2 to be applied to the intra-prediction block and a weight of 2 to be applied to the inter-prediction block.

Mode selection unit 202 may generate a prediction block using a weighted combination of the intra-prediction block and the inter-prediction block according to the determined weights. For example, mode selection unit 202 may apply the intra-prediction weight to samples of the intra-prediction block and apply the inter-prediction weight to samples of the inter-prediction block, e.g., according to the formula pred(x,y)=(wIntra*intraPred(x,y)+wInter*interPred(x,y)+offset)/(wIntra+wInter). Mode selection unit 202 may then add samples of the weighted intra-prediction block to corresponding samples of the weighted inter-prediction block, and divide the resulting samples by the sum of the weights, e.g., 4. To avoid actually performing a division operation, mode selection unit 202 may perform a bitwise right-shift by 4 on each of the samples of the block. The resulting block may correspond to the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

In this manner, video encoder 200 represents an example of a device for encoding video data that includes a memory configured to store video data; and one or more processors implemented in circuitry and configured to: determine a first number of neighboring blocks to a current block of the video data that are intra-predicted; determine a second number of the neighboring blocks that are inter-predicted; determine a first weight value to be applied to intra-prediction samples of an intra-prediction block for the current block according to the first number and the second number; determine a second weight value to be applied to inter-prediction samples of an inter-prediction block for the current block according to the first number and the second number; generate a prediction block for the current block as a weighted combination of the intra-prediction block to which the first weight value is applied and the inter-prediction block to which the second weight value is applied; and code the current block using the prediction block.

Figure 17:
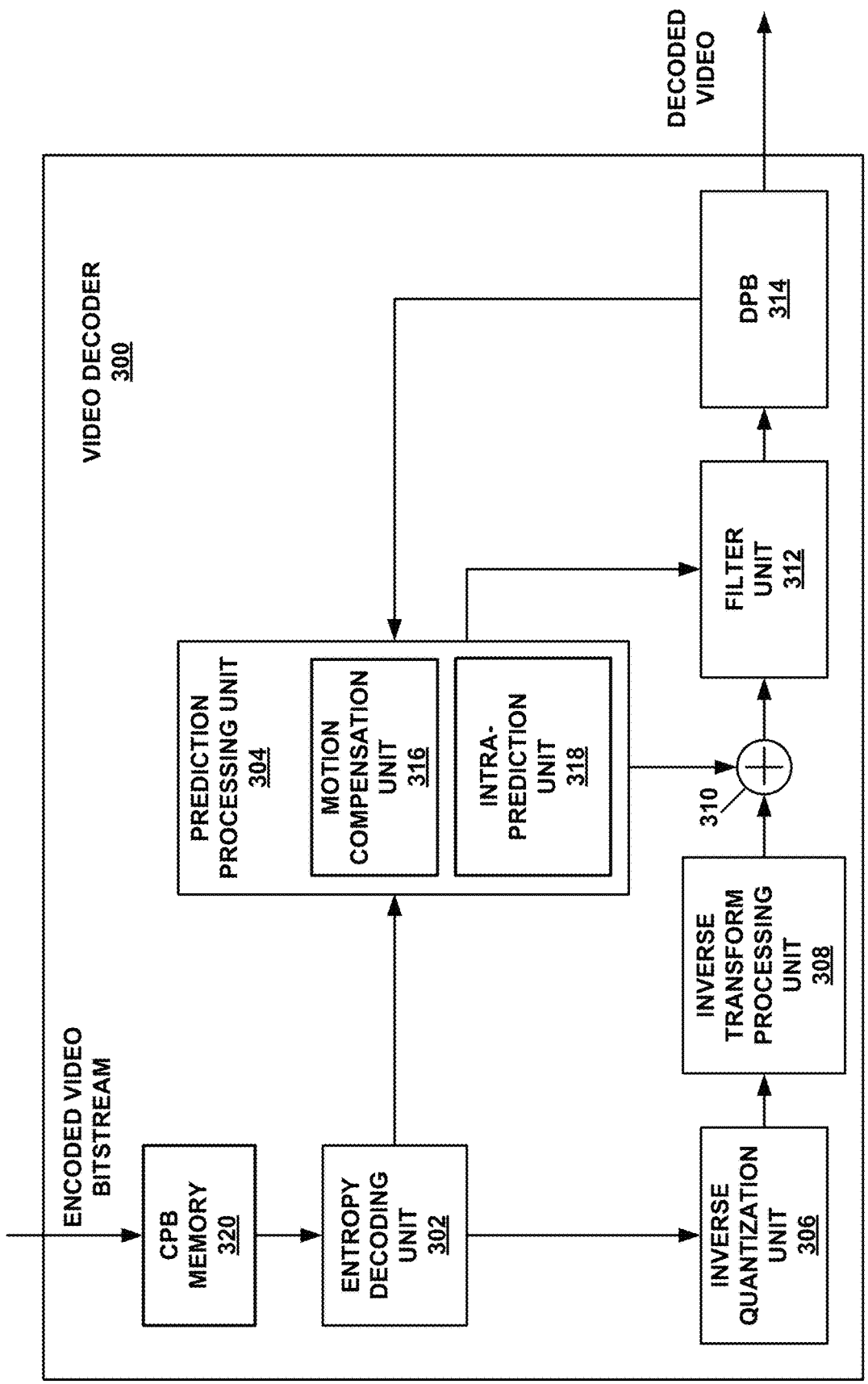
FIG. 17 is a block diagram illustrating an example video decoder that may implement one or more techniques described in this disclosure.

FIG. 17 is a block diagram illustrating an example video decoder 300 that may perform the techniques of this disclosure. FIG. 17 is provided for purposes of explanation and is not limiting on the techniques as broadly exemplified and described in this disclosure. For purposes of explanation, this disclosure describes video decoder 300 is described according to the techniques of VVC and HEVC. However, the techniques of this disclosure may be performed by video coding devices that are configured to other video coding standards.

In the example of FIG. 17, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions. Non-limiting examples of processing circuitry that video decoder 300 may include are fixed function circuitry, programmable circuitry, and ASICs.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 17 are illustrated to assist with understanding the operations performed by video decoder 300. The units may be implemented as fixed-function circuits, programmable circuits, or a combination thereof. Similar to FIG. 16, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 16).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 16). Intra-prediction unit 318 may retrieve data of neighboring samples to the current block from DPB 314.

As another example, according to the techniques of this disclosure, if the prediction information syntax elements indicate that the current block is predicted using PDPC, prediction processing unit 304 may further cause intra-prediction unit 318 and motion compensation unit 316 to perform PDPC according to the techniques of this disclosure to generate a prediction block. In general, intra-prediction unit 318 may generate an intra-prediction block for the block and motion compensation unit 316 may generate an inter-prediction block for the block. Prediction processing unit 304 may then determine prediction modes for neighboring blocks to the current block, e.g., the neighboring blocks of FIG. 15A or 15B.

Prediction processing unit 304 may then determine weights to be applied to the intra-prediction block and the inter-prediction block according to the prediction modes for the neighboring blocks. In one example, if both the above-neighboring block and the left-neighboring block are intra-predicted, prediction processing unit 304 may determine a weight of 3 to be applied to the intra-prediction block and a weight of 1 to be applied to the inter-prediction block; if both the above-neighboring block and the left-neighboring block are inter-predicted, prediction processing unit 304 may determine a weight of 3 to be applied to the inter-prediction block and a weight of 1 to be applied to the intra-prediction block; and if one of the above-neighboring block and the left-neighboring block is intra-predicted and the other is inter-predicted, prediction processing unit 304 may determine a weight of 2 to be applied to the intra-prediction block and a weight of 2 to be applied to the inter-prediction block.

Prediction processing unit 304 may generate a prediction block using a weighted combination of the intra-prediction block and the inter-prediction block according to the determined weights. For example, prediction processing unit 304 may apply the intra-prediction weight to samples of the intra-prediction block and apply the inter-prediction weight to samples of the inter-prediction block, e.g., according to the formula pred(x,y)=(wIntra*intraPred(x,y)+wInter*interPred(x,y)+offset)/(wIntra+wInter).

Prediction processing unit 304 may then add samples of the weighted intra-prediction block to corresponding samples of the weighted inter-prediction block, and divide the resulting samples by the sum of the weights, e.g., 4. To avoid actually performing a division operation, prediction processing unit 304 may perform a bitwise right-shift by 4 on each of the samples of the block. The resulting block may correspond to the prediction block.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a device for decoding video data including a memory configured to store video data, and one or more processing units implemented in processing circuitry and configured to perform example techniques described in this disclosure.

For example, the processing circuitry may be configured to determine a boundary luma value. Samples having values less than or equal to the boundary luma value are classified as a first group and samples having values greater than the boundary luma value are classified as a second group. The processing circuitry may be configured to determine first set of predicted samples of a predicted block for samples of the first group based on a first prediction model having a first parameter and a second parameter, and determine second set of predicted samples of the predicted block for samples of the second group based on a second prediction model having a third parameter and a fourth parameter.

For example, the first model is $\alpha1*Rec_L'[x,y]+\beta1$ if $Rec_L'[x,y] \leq Threshold$. In this example, the first set of predicted samples of the predicted block are those generated from the first model. The first parameter is $\alpha1$, and the second parameter is $\beta1$. The second model is $\alpha2*Rec_L'[x,y]+\beta2$ if $Rec_L'[x,y] > Threshold$. In this example, the second set of predicted samples of the predicted block are those generated from the second model. The third parameter is $\alpha2$, and the fourth parameter is $\beta2$.

The processing circuitry may be configured to determine at least one of the first parameter, second parameter, third parameter or fourth parameter. To determine at least one of the first, second, third, or fourth parameter, the processing circuitry may be configured to determine a first luma sample in the first group having a largest luma value among samples in the first group, determine a first chroma sample corresponding to the first luma sample, determine a second luma sample in the second group having a smallest luma value among samples in the second group, determine a second chroma sample corresponding to the second luma sample, and determine at least one of the first parameter, second parameter, third parameter, or fourth parameter based on the first chroma sample and the second chroma sample.

The processing circuitry may be configured to reconstruct a current block based at least in part on the predicted block and a residual block.

As one example, the processing circuitry may determine a derived chroma value based on the first chroma sample and the second chroma sample. To determine at least one of the first parameter, second parameter, third parameter, or fourth parameter based on the first chroma sample and the second chroma sample, the processing circuitry may be configured to determine at least one of the first parameter, second parameter, third parameter, or fourth parameter based on the derived chroma value. For instance, the processing circuitry may determine an average of the first chroma sample and the second chroma sample to determine the derived chroma value.

To determine at least one of the first parameter, second parameter, third parameter, or fourth parameter based on the derived chroma value, the processing circuitry may be configured to determine the first parameter ($\alpha1$) as being equal to $(c-Cy)/(Y1-Yb)$, determine the second parameter ($\beta1$) as being equal to $Cy-\alpha1*Yb$, determine the third parameter ($\alpha2$) as being equal to $(c-Cx)/(Y1-Ya)$, and determine the fourth parameter ($\beta2$) as being equal to $Cx-\alpha2*Ya$. In this example, c is equal to the derived chroma value, Cy is equal to second chroma sample, Y1 is equal to the boundary luma value, Yb is equal to the second luma sample, Cx is equal to first chroma sample, and Ya is equal to the first luma sample.

In some examples, the boundary luma value may be such that the predicted samples at the boundary luma value using the prediction models may be the same or within a threshold difference value. For instance, assume that a first predicted sample is equal to the first parameter multiplied by the boundary luma value plus the second parameter, and a second predicted sample is equal to the third parameter multiplied by the boundary luma value plus the fourth parameter. In this example, the boundary luma value is such that a difference (e.g., absolute value of the difference) between the first predicted sample and the second predicted sample is less than a threshold difference value. The threshold difference value may be approximately equal to 0 in some example.

In this manner, video decoder 300 represents an example of a device for decoding video data including a memory configured to store video data; and one or more processors implemented in circuitry and configured to: determine a first number of neighboring blocks to a current block of the video data that are intra-predicted; determine a second number of the neighboring blocks that are inter-predicted; determine a first weight value to be applied to intra-prediction samples of an intra-prediction block for the current block according to the first number and the second number; determine a second weight value to be applied to inter-prediction samples of an inter-prediction block for the current block according to the first number and the second number; generate a prediction block for the current block as a weighted combination of the intra-prediction block to which the first weight value is applied and the inter-prediction block to which the second weight value is applied; and code the current block using the prediction block.

Figure 18:
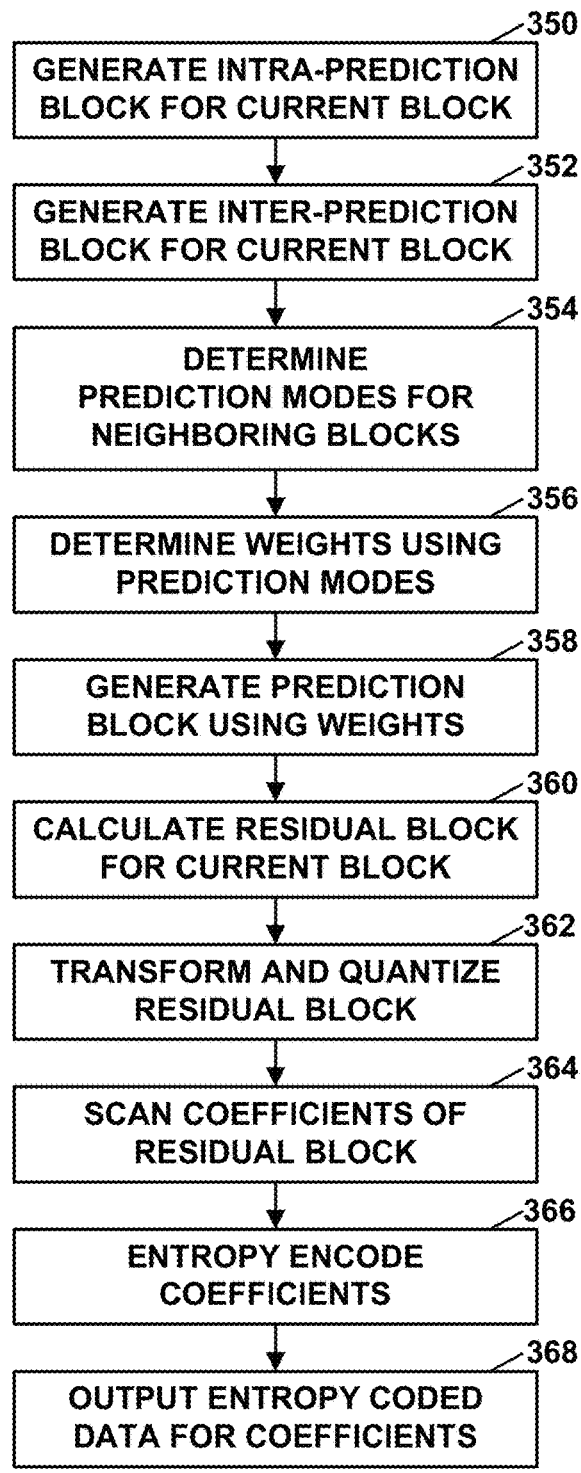
FIG. 18 is a flowchart illustrating an example method of encoding video data according to the techniques of this disclosure.

FIG. 18 is a flowchart illustrating an example method of encoding video data according to the techniques of this disclosure. Although described with respect to video encoder 200 (FIGS. 1 and 16), it should be understood that other devices may be configured to perform a method similar to that of FIG. 18.

In this example, video encoder 200 initially predicts the current block using PDPC according to the techniques of this disclosure. In particular, video encoder 200 generates an intra-prediction block for the current block (350) and then generates an inter-prediction block for the current block (352). Video encoder 200 may then determine prediction modes for neighboring blocks to the current block (354). For example, video encoder 200 may determine prediction modes for an above-neighboring block and a left-neighboring block, such as those shown in FIGS. 15A and 15B.

Video encoder 200 may then determine weights to be applied to the intra-prediction block and the inter-prediction block according to the prediction modes for the neighboring blocks (356). In one example, if both the above-neighboring block and the left-neighboring block are intra-predicted, video encoder 200 may determine a weight of 3 to be applied to the intra-prediction block and a weight of 1 to be applied to the inter-prediction block; if both the above-neighboring block and the left-neighboring block are inter-predicted, video encoder 200 may determine a weight of 3 to be applied to the inter-prediction block and a weight of 1 to be applied to the intra-prediction block; and if one of the above-neighboring block and the left-neighboring block is intra-predicted and the other is inter-predicted, video encoder 200 may determine a weight of 2 to be applied to the intra-prediction block and a weight of 2 to be applied to the inter-prediction block.

Video encoder 200 may then generate a prediction block using the weights (358). For example, video encoder 200 may apply the intra-prediction weight to samples of the intra-prediction block and apply the inter-prediction weight to samples of the inter-prediction block, e.g., according to the formula $pred(x,y)=(wIntra*intraPred(x,y)+wInter*interPred(x,y)+offset)/(wIntra+wInter)$. Video encoder 200 may then add samples of the weighted intra-prediction block to corresponding samples of the weighted inter-prediction block, and divide the resulting samples by the sum of the weights, e.g., 4. To avoid actually performing a division operation, video encoder 200 may perform a bitwise right-shift by 4 on each of the samples of the block. The resulting block may correspond to the prediction block.

Video encoder 200 may then calculate a residual block for the current block (360). To calculate the residual block, video encoder 200 may calculate a difference between the original, unencoded block and the prediction block for the current block. Video encoder 200 may then transform and quantize coefficients of the residual block (362). Next, video encoder 200 may scan the quantized transform coefficients of the residual block (364). During the scan, or following the scan, video encoder 200 may entropy encode the transform coefficients (366). For example, video encoder 200 may encode the transform coefficients using CAVLC or CABAC. Video encoder 200 may then output the entropy encoded data for coefficients of the block (368).

In this manner, the method of FIG. 18 represents an example of a method of encoding video data including determining a first number of neighboring blocks to a current block that are intra-predicted; determining a second number of the neighboring blocks that are inter-predicted; determining a first weight value to be applied to intra-prediction samples of an intra-prediction block for the current block according to the first number and the second number; determining a second weight value to be applied to inter-prediction samples of an inter-prediction block for the current block according to the first number and the second number; generating a prediction block for the current block as a weighted combination of the intra-prediction block to which the first weight value is applied and the inter-prediction block to which the second weight value is applied; and coding the current block using the prediction block.

Figure 19:
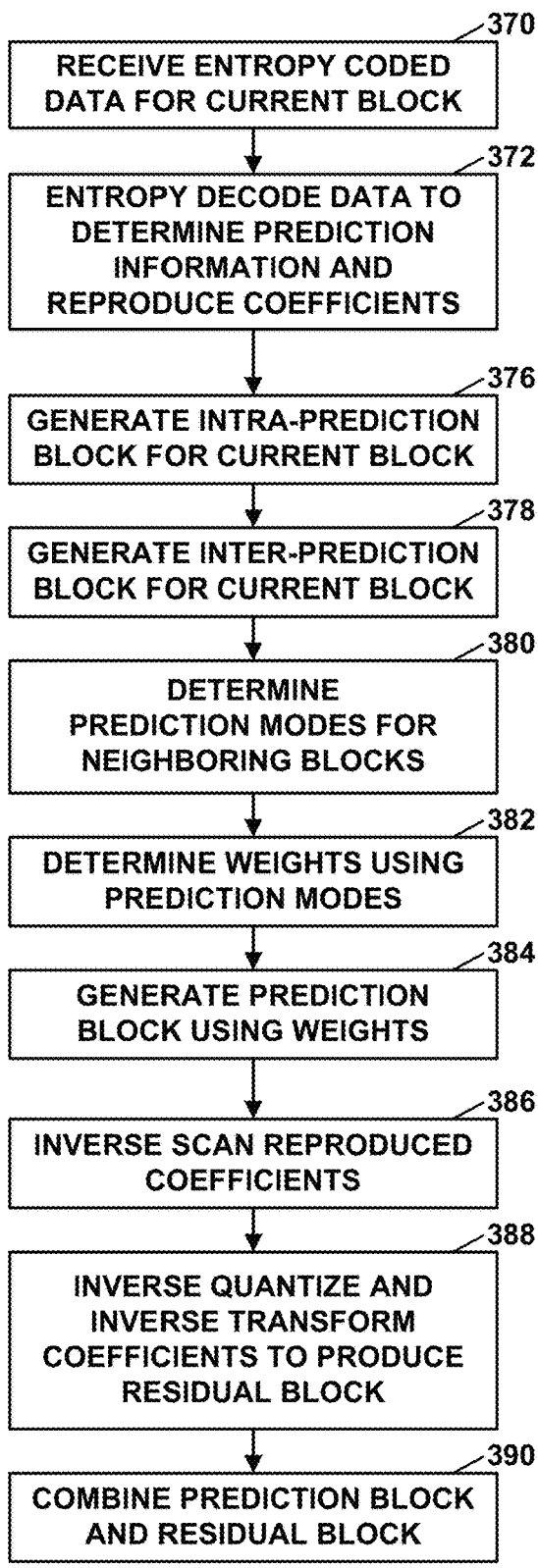
FIG. 19 is a flowchart illustrating an example method of decoding video data according to the techniques of this disclosure.

FIG. 19 is a flowchart illustrating an example method of decoding video data according to the techniques of this disclosure. Although described with respect to video decoder 300 (FIGS. 1 and 17), it should be understood that other devices may be configured to perform a method similar to that of FIG. 19.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). According to the example of FIG. 19, the prediction information of the current block may indicate that the current block is to be predicted using PDPC according to the techniques of this disclosure.

Video decoder 300 may then predict the current block, e.g., using PDPC according to the techniques of this disclosure. In particular, video decoder 300 generates an intra-prediction block for the current block (376) and then generates an inter-prediction block for the current block (378). Video decoder 300 may then determine prediction modes for neighboring blocks to the current block (380). For example, video decoder 300 may determine prediction modes for an above-neighboring block and a left-neighboring block, such as those shown in FIGS. 15A and 15B.

Video decoder 300 may then determine weights to be applied to the intra-prediction block and the inter-prediction block according to the prediction modes for the neighboring blocks (382). In one example, if both the above-neighboring block and the left-neighboring block are intra-predicted, video decoder 300 may determine a weight of 3 to be applied to the intra-prediction block and a weight of 1 to be applied to the inter-prediction block; if both the above-neighboring block and the left-neighboring block are inter-predicted, video decoder 300 may determine a weight of 3 to be applied to the inter-prediction block and a weight of 1 to be applied to the intra-prediction block; and if one of the above-neighboring block and the left-neighboring block is intra-predicted and the other is inter-predicted, video decoder 300 may determine a weight of 2 to be applied to the intra-prediction block and a weight of 2 to be applied to the inter-prediction block.

Video decoder 300 may then generate a prediction block using the weights (384). For example, video decoder 300 may apply the intra-prediction weight to samples of the intra-prediction block and apply the inter-prediction weight to samples of the inter-prediction block, e.g., according to the formula pred(x,y)=(wIntra*intraPred(x,y)+wInter*interPred(x,y)+offset)/(wIntra+wInter). Video decoder 300 may then add samples of the weighted intra-prediction block to corresponding samples of the weighted inter-prediction block, and divide the resulting samples by the sum of the weights, e.g., 4. To avoid actually performing a division operation, video decoder 300 may perform a bitwise right-shift by 4 on each of the samples of the block. The resulting block may correspond to the prediction block.

Video decoder 300 may then inverse scan the reproduced coefficients (386), to create a block of quantized transform coefficients. Video decoder 300 may then inverse quantize and inverse transform the transform coefficients to produce a residual block (388). Video decoder 300 may ultimately decode the current block by combining the prediction block and the residual block (390).

In this manner, the method of FIG. 19 represents an example of a method of decoding video data including determining a first number of neighboring blocks to a current block that are intra-predicted; determining a second number of the neighboring blocks that are inter-predicted; determining a first weight value to be applied to intra-prediction samples of an intra-prediction block for the current block according to the first number and the second number; determining a second weight value to be applied to inter-prediction samples of an inter-prediction block for the current block according to the first number and the second number; generating a prediction block for the current block as a weighted combination of the intra-prediction block to which the first weight value is applied and the inter-prediction block to which the second weight value is applied; and coding the current block using the prediction block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor," "processing circuitry," or "circuit" as used herein may refer to any of the foregoing structures or any other structure suitable for implementation of the techniques described herein, and may be used inter-changeably where appropriate. In addition, in some aspects, the functionality described herein may be provided within dedicated hardware and/or software circuits configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining that neighboring blocks to a current block comprise an above-neighboring block above the current block and a left-neighboring block to the left of the current block;
   determining a first weight value to be applied to intra-prediction samples of an intra-prediction block for the current block;
   determining a second weight value to be applied to inter-prediction samples of an inter-prediction block for the current block;
   wherein determining the first weight value and the second weight value comprises:
      when the above-neighboring block and the left-neighboring block are each intra-predicted, determining the first weight value and the second weight value comprises determining the first weight value to be equal to 3 and determining the second weight value to be equal to 1;
      when one of the above-neighboring block or the left-neighboring block is intra-predicted and the other of the above-neighboring block or the left-neighboring block is inter-predicted, determining the first weight value and the second weight value comprises determining the first weight value to be equal to 2 and determining the second weight value to be equal to 2; and
      when the above-neighboring block and the left-neighboring block are each inter-predicted, determining the first weight value and the second weight value comprises determining the first weight value to be equal to 1 and determining the second weight value to be equal to 3,
   generating a prediction block for the current block as a weighted combination of the intra-prediction block to which the first weight value is applied and the inter-prediction block to which the second weight value is applied; and
   coding the current block using the prediction block.

2. The method of claim 1, wherein the above-neighboring block comprises a block above the current block that touches an upper-left corner of the current block, and wherein the left-neighboring block comprises a block to the left of the current block that touches the upper-left corner of the current block.

3. The method of claim 1, wherein the above-neighboring block comprises a block above the current block that touches an upper-right corner of the current block, and wherein the left-neighboring block comprises a block to the left of the current block that touches a lower-left corner of the current block.

4. A method of coding video data, the method comprising:
   determining a first number of neighboring blocks to a current block that are intra-predicted;
   determining a second number of the neighboring blocks that are inter-predicted;
   determining a first weight value to be applied to intra-prediction samples of an intra-prediction block for the current block according to the first number and the second number;
   determining a second weight value to be applied to inter-prediction samples of an inter-prediction block for the current block according to the first number and the second number;
   generating a prediction block for the current block as a weighted combination of the intra-prediction block to which the first weight value is applied and the inter-prediction block to which the second weight value is applied, wherein generating the prediction block comprises generating a prediction sample at position (x,y) of the prediction block using the formula pred(x,y)=(wIntra * intraPred(x,y)+wInter * interPred(x,y)+offset)/(wIntra+wInter), wherein pred(x,y) comprises the prediction sample at position (x,y) of the prediction block, wIntra comprises the first weight value, wInter comprises the second weight value, intraPred(x,y) comprises a value of a sample at position (x,y) of the intra-prediction block, interPred(x,y) comprises a value of a sample at position (x,y) of the inter-prediction block, and offset comprises an offset value; and
   coding the current block using the prediction block.

5. The method of claim 4, wherein performing the division operation of the formula comprises performing a bitwise right shift of the numerator of the formula by (wIntra+wInter).

6. The method of claim 1, wherein coding the current block comprises decoding the current block, comprising:
   decoding a residual block for the current block; and
   combining the prediction block with the residual block to produce a decoded block.

7. The method of claim 1, wherein coding the current block comprises encoding the current block, comprising:
   generating a residual block representing differences between the current block and the prediction block; and
   encoding the residual block.

8. A device for coding video data, the device comprising:
   a memory configured to store video data; and
   one or more processors implemented in circuitry and configured to:
   determine that neighboring blocks to a current block of the video data comprise an above-neighboring block above the current block and a left-neighboring block to the left of the current block;
   determine a first weight value to be applied to intra-prediction samples of an intra-prediction block for the current block;
   determine a second weight value to be applied to inter-prediction samples of an inter-prediction block for the current block;
   wherein to determine the first weight value and the second weight value, the one or more processors are configured to:
      when the above-neighboring block and the left-neighboring block are each intra-predicted, determine the first weight value to be equal to 3 and the second weight value to be equal to 1;
      when one of the above-neighboring block or the left-neighboring block is intra-predicted and the other of the above-neighboring block or the left-neighboring block is inter-predicted, determine the first weight value to be equal to 2 and the second weight value to be equal to 2; and
      when the above-neighboring block and the left-neighboring block are each inter-predicted, determine the first weight value to be equal to 1 and the second weight value to be equal to 3,
   generate a prediction block for the current block as a weighted combination of the intra-prediction block to which the first weight value is applied and the inter-prediction block to which the second weight value is applied; and
   code the current block using the prediction block.

9. The device of claim 8, wherein the above-neighboring block comprises a block above the current block that touches an upper-left corner of the current block, and wherein the left-neighboring block comprises a block to the left of the current block that touches the upper-left corner of the current block.

10. The device of claim 8, wherein the above-neighboring block comprises a block above the current block that touches an upper-right corner of the current block, and wherein the left-neighboring block comprises a block to the left of the current block that touches a lower-left corner of the current block.

11. A device for coding video data, the device comprising:
a memory configured to store video data; and
one or more processors implemented in circuitry and configured to:
determine a first number of neighboring blocks to a current block of the video data that are intra-predicted;
determine a second number of the neighboring blocks that are inter-predicted;
determine a first weight value to be applied to intra-prediction samples of an intra-prediction block for the current block according to the first number and the second number;
determine a second weight value to be applied to inter-prediction samples of an inter-prediction block for the current block according to the first number and the second number;
generate a prediction block for the current block as a weighted combination of the intra-prediction block to which the first weight value is applied and the inter-prediction block to which the second weight value is applied, wherein to generate the prediction block, the one or more processors are configured to generate a prediction sample at position (x,y) of the prediction block using the formula pred(x,y)=(wIntra * intraPred(x,y)+wInter * interPred(x,y)+offset)/(wIntra+wInter), wherein pred(x,y) comprises the prediction sample at position (x,y) of the prediction block, wIntra comprises the first weight value, wInter comprises the second weight value, intraPred(x,y) comprises a value of a sample at position (x,y) of the intra-prediction block, interPred(x,y) comprises a value of a sample at position (x,y) of the inter-prediction block, and offset comprises an offset value; and
code the current block using the prediction block.

12. The device of claim 11, wherein to perform the division operation of the formula, the one or more processors are configured to perform a bitwise right shift of the numerator of the formula by (wIntra+wInter).

13. The device of claim 8, wherein to code the current block, the one or more processors are configured to decode the current block, wherein the one or more processors are configured to:
decode a residual block for the current block; and
combine the prediction block with the residual block to produce a decoded block.

14. The device of claim 8, wherein to code the current block, the one or more processors are configured to encode the current block, wherein the one or more processors are configured to:
generate a residual block representing differences between the current block and the prediction block; and
encode the residual block.

15. A non-transitory computer-readable storage medium having stored thereon instructions that, when executed, cause a processor to:
determine that neighboring blocks to a current block comprise an above-neighboring block above the current block and a left-neighboring block to the left of the current block;
determine a first weight value to be applied to intra-prediction samples of an intra-prediction block for the current block;
determine a second weight value to be applied to inter-prediction samples of an inter-prediction block for the current block according to the first number and the second number;
wherein the instructions that cause the processor to determine the first weight value and the second weight value comprise instructions that cause the processor to:
when the above-neighboring block and the left-neighboring block are each intra-predicted, determine the first weight value to be equal to 3 and the second weight value to be equal to 1;
when one of the above-neighboring block or the left-neighboring block is intra-predicted and the other of the above-neighboring block or the left-neighboring block is inter-predicted, determine the first weight value to be equal to 2 and the second weight value to be equal to 2; and
when the above-neighboring block and the left-neighboring block are each inter-predicted, determine the first weight value to be equal to 1 and the second weight value to be equal to 3,
generate a prediction block for the current block as a weighted combination of the intra-prediction block to which the first weight value is applied and the inter-prediction block to which the second weight value is applied; and
code the current block using the prediction block.

16. The non-transitory computer-readable storage medium of claim 14, wherein the above-neighboring block comprises a block above the current block that touches an upper-left corner of the current block, and wherein the left-neighboring block comprises a block to the left of the current block that touches the upper-left corner of the current block.

17. The non-transitory computer-readable storage medium of claim 14, wherein the above-neighboring block comprises a block above the current block that touches an upper-right corner of the current block, and wherein the left-neighboring block comprises a block to the left of the current block that touches a lower-left corner of the current block.

18. A non-transitory computer-readable storage medium having stored thereon instructions that, when executed, cause a processor to:
determine a first number of neighboring blocks to a current block that are intra-predicted;
determine a second number of the neighboring blocks that are inter-predicted;
determine a first weight value to be applied to intra-prediction samples of an intra-prediction block for the current block according to the first number and the second number;
determine a second weight value to be applied to inter-prediction samples of an inter-prediction block for the current block according to the first number and the second number;

generate a prediction block for the current block as a weighted combination of the intra-prediction block to which the first weight value is applied and the inter-prediction block to which the second weight value is applied, wherein the instructions that cause the processor to generate the prediction block comprise instructions that cause the processor to generate a prediction sample at position (x,y) of the prediction block using the formula pred(x,y)=(wIntra * intraPred(x,y)+wInter * interPred(x,y)+offset)/(wIntra+wInter), wherein pred (x,y) comprises the prediction sample at position (x,y) of the prediction block, wIntra comprises the first weight value, wInter comprises the second weight value, intraPred(x,y) comprises a value of a sample at position (x,y) of the intra-prediction block, interPred (x,y) comprises a value of a sample at position (x,y) of the inter-prediction block, and offset comprises an offset value; and code the current block using the prediction block.

19. The non-transitory computer-readable storage medium of claim 18, wherein the instructions that cause the processor to perform the division operation of the formula comprise instructions that cause the processor to perform a bitwise right shift of the numerator of the formula by (wIntra+wInter).

20. The non-transitory computer-readable storage medium of claim 15, wherein the instructions that cause the processor to code the current block comprise instructions that cause the processor to decode the current block, comprising instructions that cause the processor to:

decode a residual block for the current block; and
combine the prediction block with the residual block to produce a decoded block.

21. The non-transitory computer-readable storage medium of claim 15, wherein the instructions that cause the processor to code the current block comprise instructions that cause the processor to decode the current block, comprising instructions that cause the processor to:

generate a residual block representing differences between the current block and the prediction block; and
encode the residual block.

22. A device for coding video data, the device comprising:
means for determining that neighboring blocks to a current block comprise an above-neighboring block above the current block and a left-neighboring block to the left of the current block;
means for determining a first weight value to be applied to intra-prediction samples of an intra-prediction block for the current block;
means for determining a second weight value to be applied to inter-prediction samples of an inter-prediction block for the current block;
wherein the means for determining the first weight value and the means for determining the second weight value comprise:
  means for determining the first weight value to be equal to 3 and means for determining the second weight value to be equal to 1 when the above-neighboring block and the left-neighboring block are each intra-predicted;
  means for determining the first weight value to be equal to 2 and determining the second weight value to be equal to 2 when one of the above-neighboring block or the left-neighboring block is intra-predicted and the other of the above-neighboring block or the left-neighboring block is inter-predicted; and
  means for determining the first weight value to be equal to 1 and means for determining the second weight value to be equal to 3 when the above-neighboring block and the left-neighboring block are each inter-predicted,
means for generating a prediction block for the current block as a weighted combination of the intra-prediction block to which the first weight value is applied and the inter-prediction block to which the second weight value is applied; and
means for coding the current block using the prediction block.

23. The device of claim 21, wherein the above-neighboring block comprises a block above the current block that touches an upper-left corner of the current block, and wherein the left-neighboring block comprises a block to the left of the current block that touches the upper-left corner of the current block.

24. The device of claim 21, wherein the above-neighboring block comprises a block above the current block that touches an upper-right corner of the current block, and wherein the left-neighboring block comprises a block to the left of the current block that touches a lower-left corner of the current block.

25. A device for coding video data, the device comprising:
means for determining a first number of neighboring blocks to a current block that are intra-predicted;
means for determining a second number of the neighboring blocks that are inter-predicted;
means for determining a first weight value to be applied to intra-prediction samples of an intra-prediction block for the current block according to the first number and the second number;
means for determining a second weight value to be applied to inter-prediction samples of an inter-prediction block for the current block according to the first number and the second number;
means for generating a prediction block for the current block as a weighted combination of the intra-prediction block to which the first weight value is applied and the inter-prediction block to which the second weight value is applied, wherein the means for generating the prediction block comprises means for generating a prediction sample at position (x,y) of the prediction block using the formula pred(x,y)=(wIntra * intraPred(x,y)+wInter * interPred(x,y)+offset)/(wIntra+wInter), wherein pred(x,y) comprises the prediction sample at position (x,y) of the prediction block, wIntra comprises the first weight value, wInter comprises the second weight value, intraPred(x,y) comprises a value of a sample at position (x,y) of the intra-prediction block, interPred(x,y) comprises a value of a sample at position (x,y) of the inter-prediction block, and offset comprises an offset value; and
means for coding the current block using the prediction block.

26. The device of claim 25, wherein the means for generating the prediction sample comprises means for performing a bitwise right shift of the numerator of the formula by (wIntra+wInter) to perform the division operation of the formula.

27. The device of claim 22, wherein the means for coding the current block comprises means for decoding the current block, comprising:
means for decoding a residual block for the current block; and means for combining the prediction block with the residual block to produce a decoded block.

28. The device of claim 22, wherein the means for coding the current block comprises means for encoding the current block, comprising:
means for generating a residual block representing differences between the current block and the prediction block; and
means for encoding the residual block.

* * * * *